United States Patent
Baratta

(10) Patent No.: US 10,307,838 B2
(45) Date of Patent: Jun. 4, 2019

(54) SUPPORT ASSEMBLY FOR A CORE DRILL

(71) Applicant: Western Saw Manufacturers, Inc., Oxnard, CA (US)

(72) Inventor: Anthony Baratta, Oak Park, CA (US)

(73) Assignee: Western Saw, Inc., Oxnard, CA (US)

( * ) Notice: Subject to any disclaimer, the term of this patent is extended or adjusted under 35 U.S.C. 154(b) by 101 days.

(21) Appl. No.: 15/050,431

(22) Filed: Feb. 22, 2016

(65) Prior Publication Data

US 2016/0167140 A1 Jun. 16, 2016

Related U.S. Application Data

(63) Continuation of application No. 14/446,164, filed on Jul. 29, 2014, now abandoned, which is a continuation-in-part of application No. 12/799,615, filed on Apr. 27, 2010, now Pat. No. 8,790,052, and a continuation-in-part of application No. 14/114,510, filed on Jan. 7, 2014, now Pat. No. 9,573,199.

(51) Int. Cl.
*B27B 5/30* (2006.01)
*B28D 1/04* (2006.01)
*B23B 51/04* (2006.01)

(52) U.S. Cl.
CPC ............ *B23B 51/0473* (2013.01); *B27B 5/30* (2013.01); *B28D 1/041* (2013.01); *B23B 2226/75* (2013.01); *B23B 2240/16* (2013.01); *B23B 2250/12* (2013.01); *Y10T 408/895* (2015.01)

(58) Field of Classification Search
CPC .............. B23B 51/042; B23B 51/0473; B23B 2250/12; B27B 5/30; B28D 1/041; Y10T 408/895; Y10T 408/907
See application file for complete search history.

(56) References Cited

U.S. PATENT DOCUMENTS

| 1,426,881 A | 8/1922 | Lachman |
| 1,503,716 A | 8/1924 | Seyferth |
| 1,591,003 A | 6/1926 | Vincent |
| 1,669,273 A | 5/1928 | Wojnowski et al. |
| 2,750,129 A | 6/1956 | Morin |

(Continued)

FOREIGN PATENT DOCUMENTS

| CH | 602304 A | 7/1978 |
| DE | 20306797 | 8/2003 |

(Continued)

OTHER PUBLICATIONS

Young, Lee W., International Search Report, PCT/US2011/00581, dated Jun. 14, 2011, 1 page, ISA/US.

(Continued)

*Primary Examiner* — Eric A Gates
(74) *Attorney, Agent, or Firm* — Henricks Slavin LLP

(57) ABSTRACT

A support assembly for a core drill which utilizes an improved high strength spoked reinforcer. The reinforcer may be removably mounted a core drill tube by fasteners. A drive connection is removably mounted and centrally located on an outer disc of a pair of discs. The drive connection is adapted to connect with a drive shaft to cause rotation of the tube. The assembly can also include a split in the disc when the high strength spoked reinforcer is not welded thereto, thereby providing a means of water control. The high strength spoked reinforcer can be a separate piece that is bolted to the disc or can be integrally formed as one piece therewith.

23 Claims, 19 Drawing Sheets

(56) References Cited

U.S. PATENT DOCUMENTS

| | | |
|---|---|---|
| 2,779,361 A | 1/1957 | McKiff |
| 2,906,256 A | 9/1959 | Glynn |
| 2,925,739 A | 2/1960 | Urquhart et al. |
| 2,950,582 A | 8/1960 | Beauchaine |
| 3,220,449 A | 11/1965 | Franklin |
| 3,382,939 A | 5/1968 | McLendon, Sr. |
| 3,843,188 A | 10/1974 | Kirschner |
| 3,884,527 A | 5/1975 | Clary |
| 4,252,481 A | 2/1981 | Krieg |
| 4,422,811 A | 12/1983 | Ellison et al. |
| 5,460,432 A | 10/1995 | Yamazaki et al. |
| 6,045,302 A | 4/2000 | Orr |
| 6,494,276 B1 | 12/2002 | Hamilton et al. |
| 6,514,017 B2 | 2/2003 | DeBlasio |
| 6,890,132 B1 | 5/2005 | Baron |
| 6,945,339 B2 | 9/2005 | Hiranuma et al. |
| 8,790,052 B2 | 7/2014 | Baratta |
| 2002/0094246 A1 | 7/2002 | Jones et al. |
| 2003/0146024 A1 | 8/2003 | Cramer et al. |
| 2005/0105980 A1 | 5/2005 | Davis |
| 2009/0035082 A1 | 2/2009 | Singh |
| 2011/0121090 A1 | 5/2011 | Price |
| 2014/0112728 A1 | 4/2014 | Baratta |
| 2014/0334892 A1 | 11/2014 | Baratta |

FOREIGN PATENT DOCUMENTS

| | | |
|---|---|---|
| DE | 202004008945 | 9/2004 |
| EP | 0603122 A1 | 6/1994 |
| GB | 2295109 | 5/1996 |
| GB | 2396395 | 6/2004 |
| RU | 2005581 C1 | 1/1994 |
| WO | WO-2011136839 | 11/2011 |
| WO | WO-2012148371 | 11/2012 |

OTHER PUBLICATIONS

Copenhaven, Blaine R., International Search Report, PCT/US2011/000748, dated Aug. 1, 2011, 2 pages, ISA/US.

Baratta, Diamond Tooling Journal, Ultra lightweight core bit from Western Saw (online), created Jun. 21, 2010, modified Jun. 22, 2010 [retrieved on Jul. 21, 2011], retrieved from the Internet: http://www.dij-online.com/userfiles/file/Vol70Num624_14_15 pdf, 2 pp.

Coja, Michael, European Search Report, EP 11775395, dated May 30, 2014, 5 pages, The Hague.

Coja, Michael, European Search Report, EP 11864551, dated Aug. 14, 2014, 6 pages, The Hague.

Yitagesu, Dereje, International Search Report, PCT/US2015/042682, dated Sep. 23, 2015, ISA/AU, 4 pages.

Yitagesu, Dereje, Written Opinion, PCT/US2015/042682, dated Sep. 23, 2015, Australia Patent Office, 5 pages.

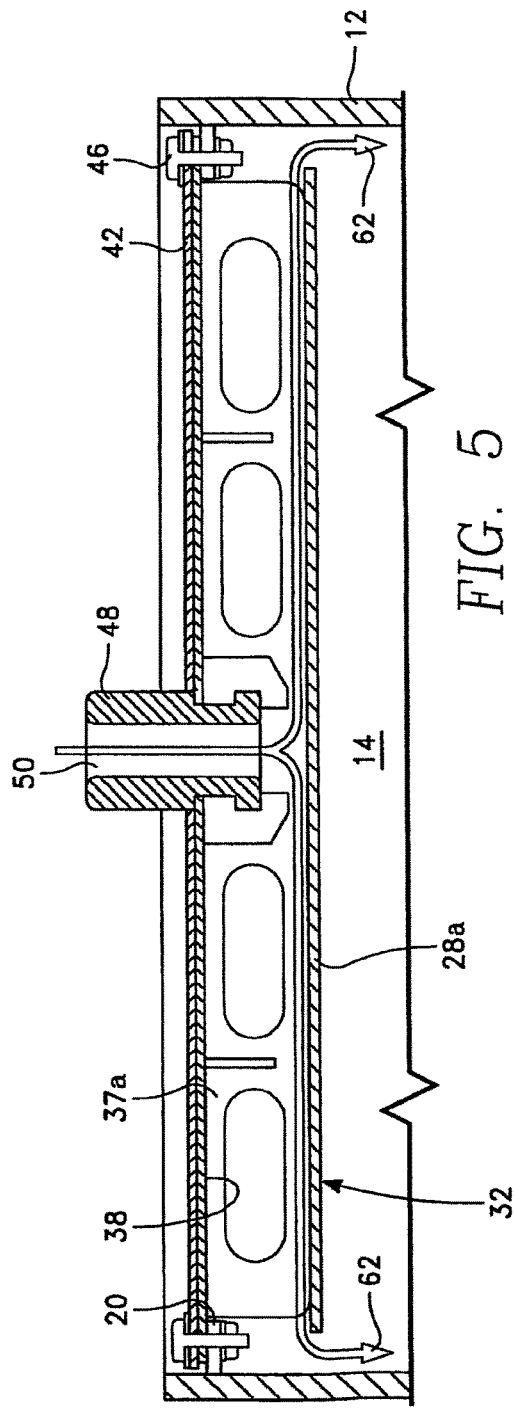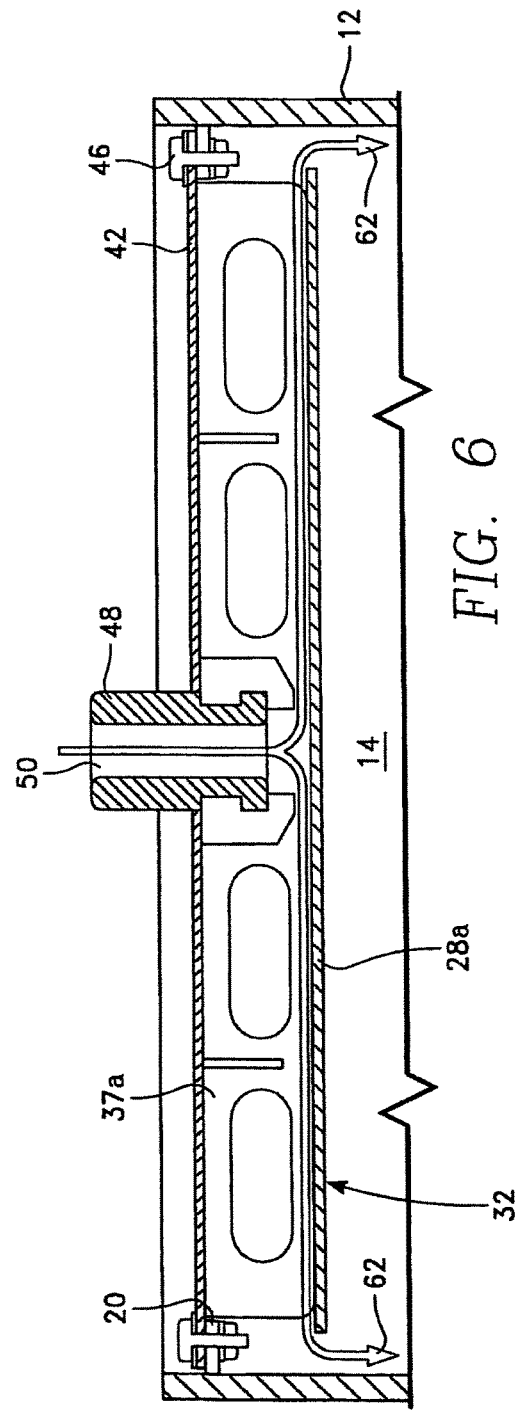

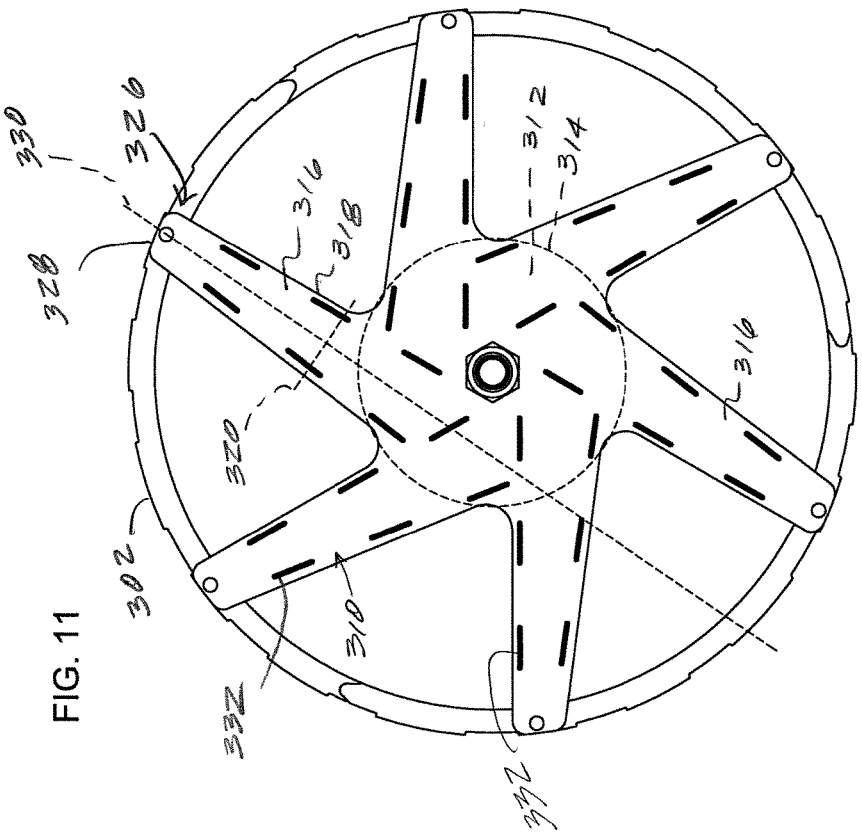
FIG. 11
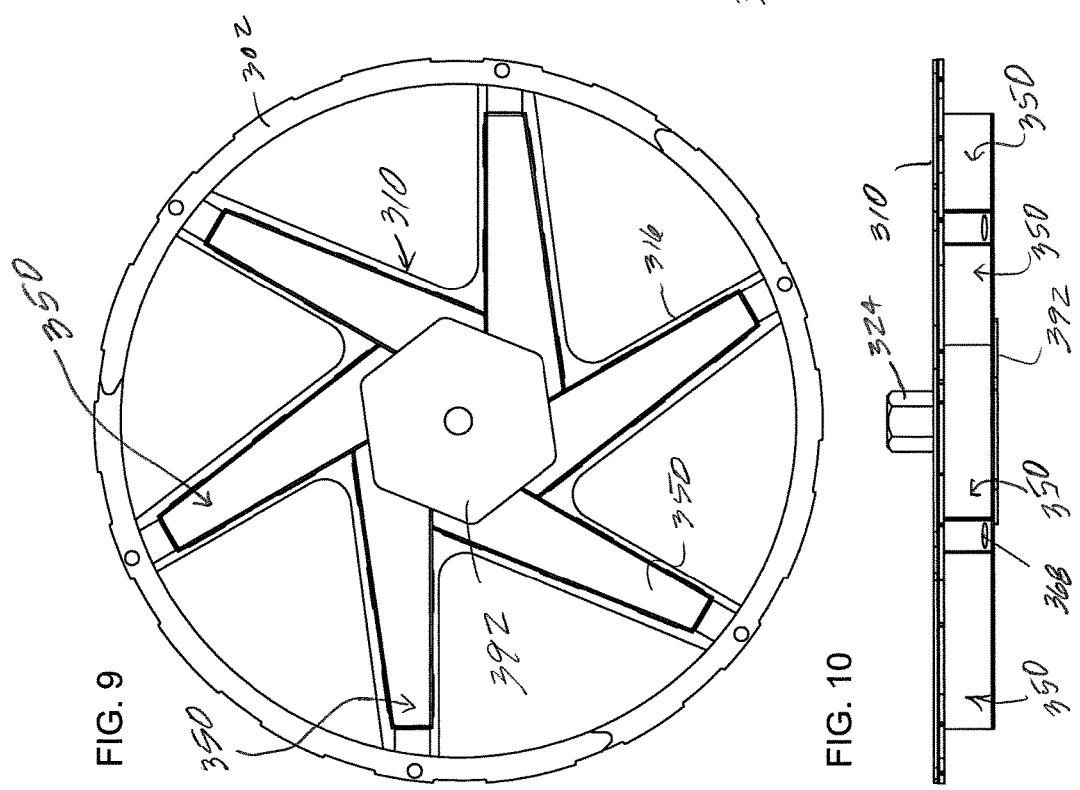
FIG. 9
FIG. 10

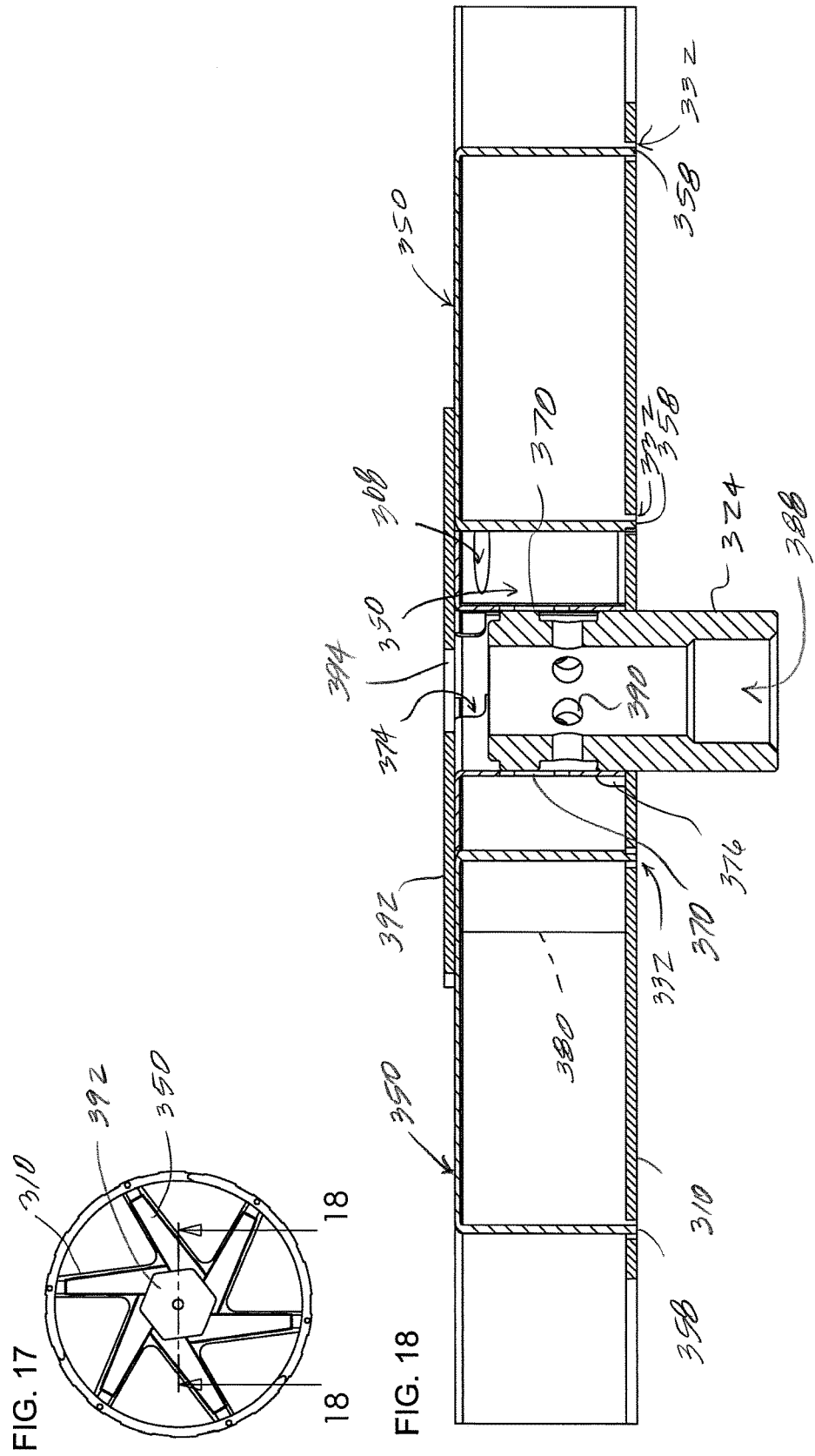

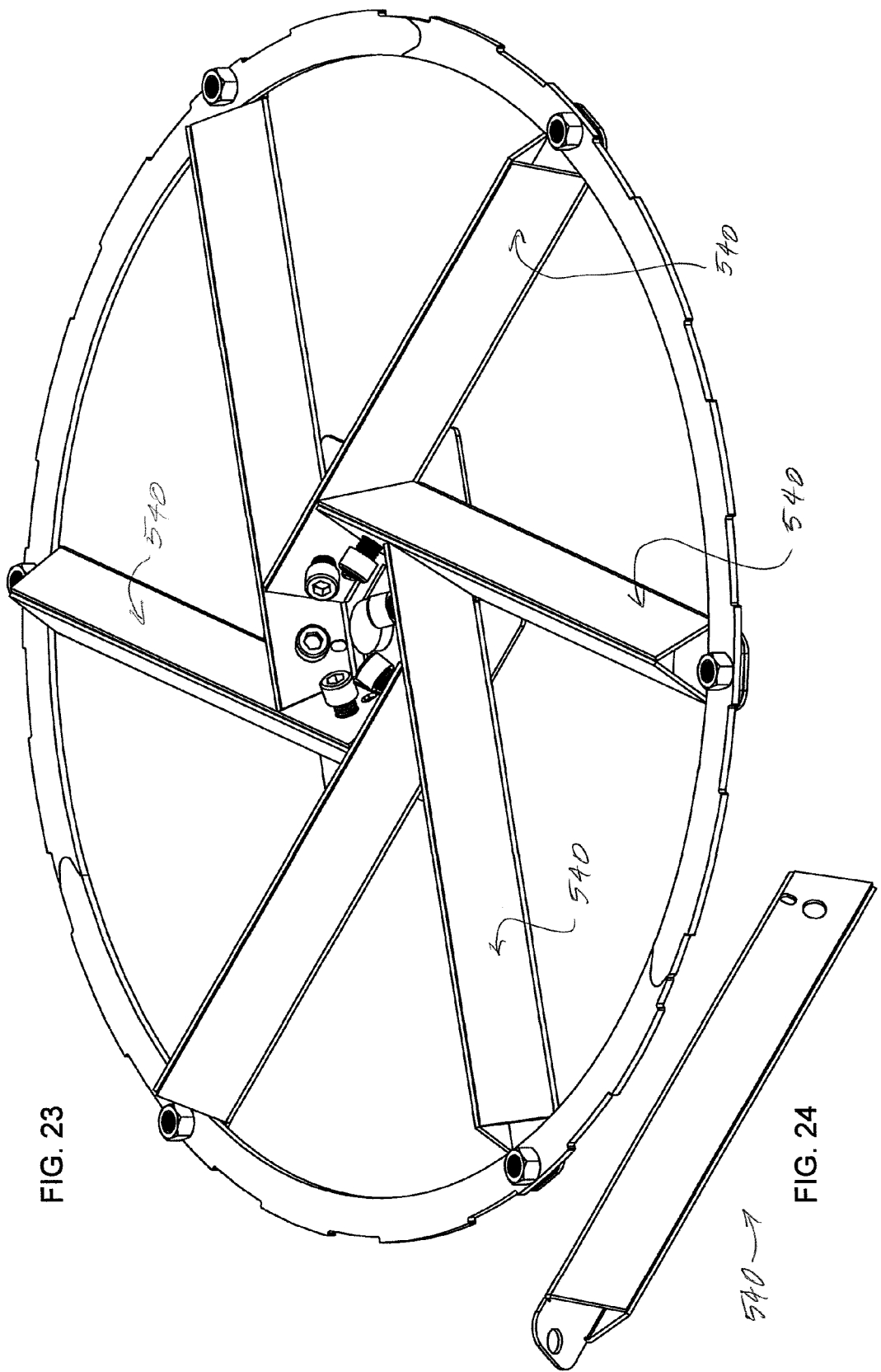

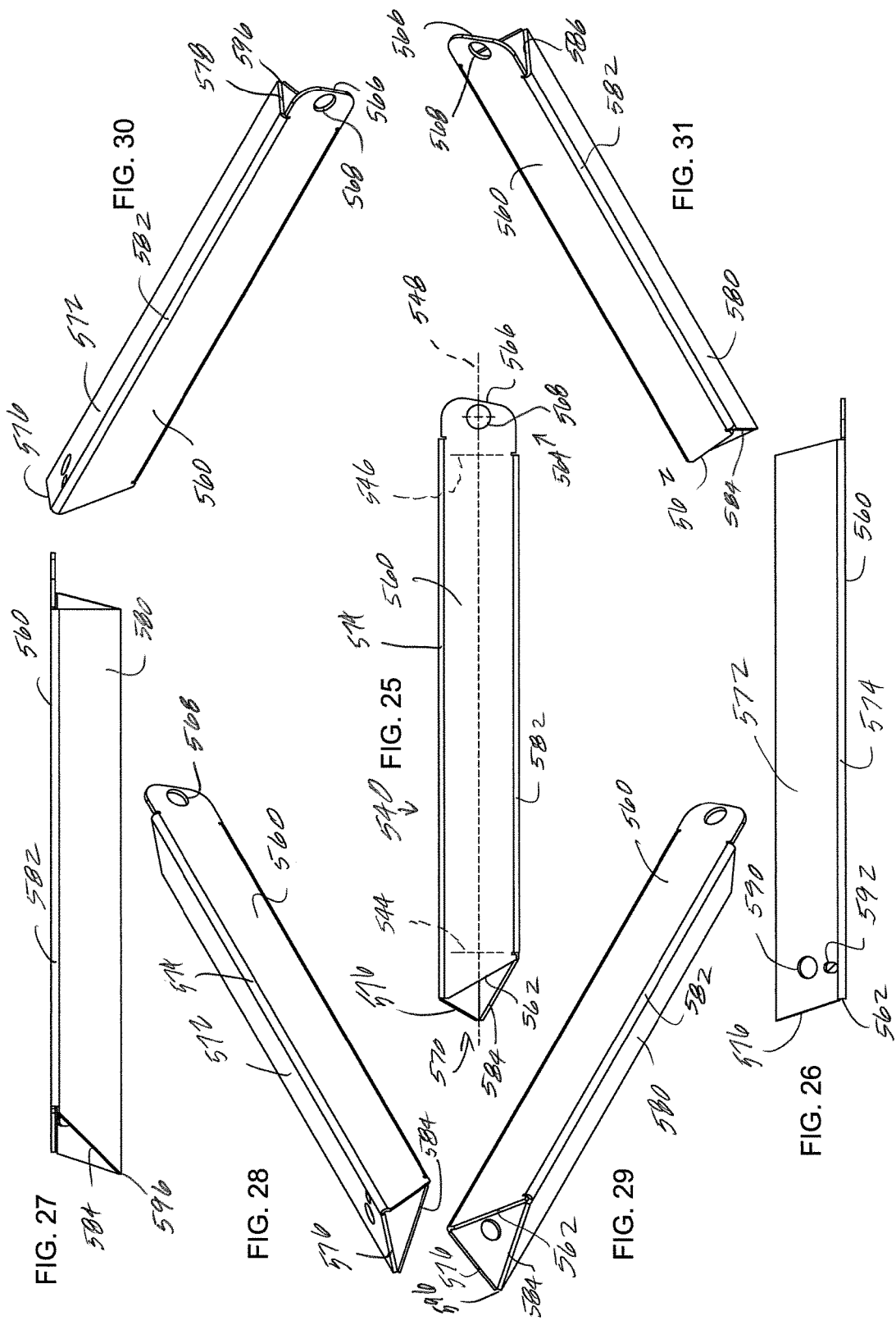

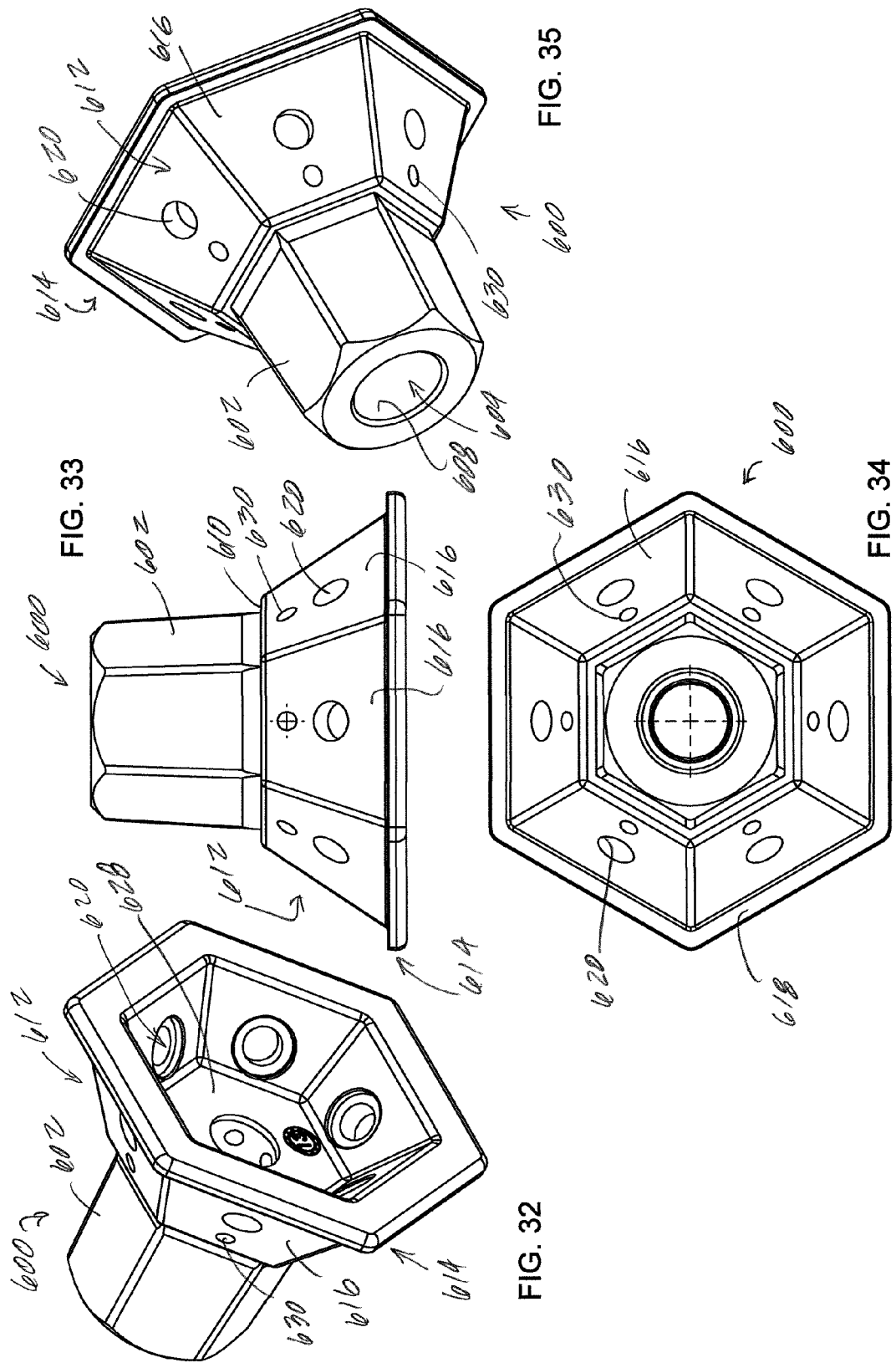

SUPPORT ASSEMBLY FOR A CORE DRILL

CROSS REFERENCE TO RELATED APPLICATIONS

This application is a continuation of U.S. Ser. No. 14/446,164, filed Jul. 29, 2014, published as US 2014/0334892, which is a continuation-in-part of U.S. Ser. No. 12/799,615, filed Apr. 27, 2010, published as US 2011/0262237, now U.S. Pat. No. 8,790,052, issued Jul. 29, 2014; and this application is also a continuation-in-part of PCT/US11/00748, filed Apr. 26, 2011, and its U.S. National Stage application Ser. No. 14/114,510, filed Jan. 7, 2014, published as US 2014/0112728, the entire content and disclosures and publications of which are incorporated herein fully by reference.

BACKGROUND

Field

The field of this invention relates generally toward cutting implements and more particularly to the construction of a core drill.

Related Art

Core drills are commonly used for drilling holes in hard materials, such as concrete and masonry. These holes are then used to support a structural member, such as a post, which is used on a support member for a building structure or for forming a large diameter borehole with the borehole being used for the passage of pipe lines or conduits. A typical core drill is constructed of hard metal, such as steel, and takes the shape of a tube with hardened cutting segments mounted at one end of the tube. The opposite end of the tube is closed generally by a solid steel plate with there being a drive connection mounted on this steel plate. The drive connection is to be connected to a rotating shaft of a drive machine which will cause the tube to be rotated and affect the cutting operation. The cutting segments at one end normally comprise diamonds but also it has been known to use silicon carbide. The diamonds are held together by a suitable resin adhesive.

The plate at the closed end of the tube is of substantial thickness, generally one half to one and a half inch thick. These core drills are frequently designed to be from six inches to thirty-six inches and more in diameter. The steel plate at the closed end is of substantial weight. It is important to have an extremely strong member at this closed end because all the force from the driving machine is being transferred to this member to the tube. The force encountered by the tube in cutting the hole in masonry and concrete is substantial so it is important that the plate at the closed end of the tube establish an extremely strong connection. However, most often these core drills are carried by a human from one location to another. The plate member at the closed end of a sixteen inch core drill is substantially heavier than the core drill constructed in accordance with this invention. That extra weight can make the difference as to whether a core drill can be carried by a single human from one location to another. It is readily apparent that the greater the diameter of the core drill the greater of the additional amount of weight. It would be desirable to design some type of closed end structure for a core drill which would be substantially lighter in weight than if a solid plate is used. Furthermore, there is a certain amount of deflection associated with the use of the core drill.

At times, when operating of a core drill, a plug of material, which would be normally masonry or cement, gets caught within the hollow chamber of the core drill adjacent the closed end plate. At the present time, access into this area is only provided through the open end of a core drill which means some kind of an elongated member has to be extended up through the hollow chamber of the core drill and this member wedged against the caught material and somehow loosen it to dislodge it. It would be desirable to construct a core drill so that the closed end portion of the core drill could be removed from the tube which would provide immediate local access to any wedged material that is caught within the hollow chamber and located directly adjacent the closed end.

SUMMARY

The instant invention teaches a bolt on drive assembly for a core drill comprising: a cylindrical tube having a cutting edge at one longitudinal end and an open end at an opposite longitudinal end; a mounting means mounted at said open end; a high strength spoked reinforcer, said spoked reinforcer having a center hub from which extends radially a plurality of spoked members, said spoked members has a strengthening member extending perpendicularly therefrom in the direction of the Z-axis and wherein said spoked members being attached to said mounting means; a disc mounted onto said high strength spoked reinforcer and also onto said mounting means; a drive connection centrally mounted on said disc, said drive connection adapted to connect to a drive shaft to cause rotation of said tube; and a series of removable fasteners to secure said disc and said high strength spoked reinforcer to said mounting means.

The above embodiment can be further modified by defining that the tube has a hollow chamber, said mounting means comprising a mounting ring, said mounting ring being located within said hollow chamber.

The above embodiment can be further modified by defining that a water stop disc is mounted to said high strength spoked reinforcer, said water stop disc to function to prevent the passage of water from within said hollow chamber through said open end.

The above embodiment can be further modified by defining that the drive connection comprises a coupler adapted to be threadably secured to a drive shaft.

The above embodiment can be further modified by defining that the coupler is removably mounted with bolt fasteners to said high strength spoked reinforcer.

The above embodiment can be further modified by defining that the high strength spoked reinforcer is integrally formed as one piece with said disc.

The above embodiment can be further modified by defining that each of said plurality of spoke members is offset from said center hub.

The above embodiment can be further modified by defining that each of said plurality of spoke members includes one or more supports along the length of each of said plurality of spoke members.

In another example of reinforcement, the reinforcement can be non-planar or have a non-planar component. A non-planar structure can extend upward or downward from a top plate, or from another structure or extension that extends from the center to the mounting ring. The non-planar structure can take a number of configurations. In one example of a non-planar structure, the structure can be nonlinear in the direction of the perimeter from the center area, but substantially straight or linear in the Z-axis direction. In another example, the non-planar structure can be linear in the direction toward the perimeter, but nonlinear in either or both of the Z-axis direction or in the X-Y direction or plane. One non-planar structure can be a triangular-cross-section tubular or channel structure extending from the area of the center toward the perimeter. In one example, the non-planar structure can have a U-channel configuration. In a further example, the tubular structure can be extruded, formed or machined. Any of the tubular or channel structures described herein can be produced by forming, machining, or extrusion. Aluminum structures can be easily extruded, and steel structures can be easily roll-formed, for example.

In another example of a non-planar structure, the structure can be a square or rectangular tubular structure, or have a square or rectangular cross section. Such a structure provides multiple reinforcement walls. Additionally, such a structure allows for the use of a thinner wall material relative to the planar reinforcement element.

A further example of a reinforcement structure between a center of the tool and a perimeter of the tool includes a non-planar extension, arm or strut structure extending from an area near the center of the tool to an area adjacent a perimeter. In one example, the extension can be a non-planar structure having a channel along a portion of the structure. In another example, the extension can be a non-planar structure having multiple walls spaced from each other. In one example, the extension can be a triangular-shaped cross section or triangular-shaped tubular or channel structure. In another example, the extension is a triangular-shaped, formed structure, with or without welds closing or securing the structure. In a further example, a channel structure having a triangular cross-section configuration can be combined with other such structures to form a central mounting configuration for a drive assembly, for example one including a drive nut or drive hub. The number of such channel structures selected may be selected according to a diameter of the tool. For example, a smaller diameter tool may have 6 or 5 such channel structures, while a larger diameter tool may have seven or eight such extensions. With multiple channel-shaped structures, adjacent channel structures can be welded to each other in the area of the center of the tool. Each structure can also be secured to a mounting ring or other structure for supporting the cylindrical core.

In any of the extensions described herein, a further structure can be mounted on top of the extensions and/or below the extensions, and can be welded thereto. In one example, a top plate can be placed on the tops of the extensions and welded thereto. The outer perimeter dimensions of the top plate may be a function of the diameter tool, and may include an opening or other interface for receiving a drive hub, drive nut, or other driving structure, such as may be for a drill.

In another example of a non-planar structure for an extension, a rectangular, square or other polygonal structure can be used, for example in conjunction with other such structures extending from a central portion of the tool to a perimeter portion of the tool. In one example, a square or rectangular channel is used to form the extension, and in a further example, a U-channel forms the extension. In one example, the U-channel is an open channel, and in another configuration, the U-channel is a closed configuration, for example partly or completely covered by another structure, for example a planar structure. In one example, the covering structure can be a top plate, and in another example, the covering structure can be a linearly-extending cover for example, a combination that forms a spoke and a reinforcement for the spoke.

In a further example of reinforcement, the reinforcement can include a water or other fluid flow channel extending in the direction of the reinforcement toward a perimeter portion of the reinforcement where the reinforcement will be coupled to a mounting ring. In one configuration, the fluid flow channel substantially prevents fluid flow other than along the channel until the fluid reaches an outer perimeter portion of the channel, for example prevents more than 10% of the fluid in the channel to exit before reaching the outer perimeter portion of the channel. In another configuration, the fluid flow channel extends at least half way from a center of the reinforcement to the perimeter of the reinforcement, and in another example at least three quarters of the distance, and in a further example to a location adjacent a mounting ring for the core drill. In one example, the fluid flow channel may be formed from a polygonal reinforcement structure extending from a center portion of the reinforcement to a perimeter portion thereof. In any of the examples described herein, a fluid flow channel may be formed as part of a respective reinforcement arm or extension.

In one example, a support assembly for a core drill includes a support element having a central opening and having at least one portion extending to an outer perimeter portion for being secured to and supporting a mounting element for a core drill. A coupling element couples the support assembly to a drill motor, and the coupling element includes openings to allow fluid to flow into and out of the coupling element. At least one channel has an opening adjacent the coupling element configured to receive fluid from the coupling element, the at least one channel extending toward a point adjacent the outer perimeter portion and configured so that fluid can flow from the opening toward the outer perimeter portion. The support assembly may have the at least one channel extending at least half the distance from the coupling element to the outer perimeter portion. The channel may have an end plate with an opening in the end plate for allowing fluid to flow from the channel outside, for example to a perimeter portion of the core drill.

In another example of reinforcement, the reinforcement can include a slanted element. In the present configurations, "slanted element" will refer to a structural support element that is both nonparallel to the Z axis and to the X-Y plane. A slanted element improves structural support in the reinforcement when used with a device such as a core drill during operation of the core drill. In one example, a slanted element can be associated with a respective spoke, arm or extension for improving the strength of the structure. In another example, a slanted element can be formed monolithic with a spoke, arm or extension, for example in one configuration by extrusion, and in another configuration by forming metal into the desired structure. In a further example, a slanted element can be combined with an extension in the X-Y plane to form a combined extension, arm or spoke, and in another configuration a slanted element can be combined with an extension in the Z-axis direction to form a combined extension, arm or spoke. In another example, multiple slanted elements can be used to form an extension, arm or spoke for helping to form a support for a structure such as a core drill. In an additional example, at least one slanted element can be incorporated in an arm, extension or spoke in the form of a triangular-shaped channel or a triangular-shaped tube. A rectangular-shaped tube can also be configured in a reinforcement structure to have a slanted element. Additionally, a polygon structure having more than four sides can be configured to have a slanted element to assist in forming a support for a structure such as a core drill.

BRIEF DESCRIPTION OF THE DRAWINGS

FIG. 5 is a transverse cross-sectional view through the assembled drive assembly of the core drill of an alternate embodiment of the invention wherein the vertical portion of each of the arms of the high strength spoked reinforcer is rectangular rather than triangulated and is a stand alone piece;

FIG. 6 is a transverse cross-sectional view through the assembled drive assembly of the core drill of a second alternate embodiment of the invention where in the spoked reinforcer is welded directly the top plate and the vertical portion of each of the arms of the high strength spoked reinforcer is rectangular rather than triangular.

FIG. 9 is a bottom plan view of the assembly of FIG. 8.

FIG. 10 is a side elevation view of the assembly of FIG. 8.

FIG. 11 is a top plan view of the assembly of FIG. 8.

FIG. 17 is a bottom plan view of the support and mounting ring of FIG. 8.

FIG. 18 is a partial transverse section of a portion of the support of FIG. 17 taken along the line 18-18.

FIG. 23 is an isometric view of the assembly of FIG. 19 with a mounting and support hub removed.

FIG. 24 is a lower isometric view of a spoke, arm or extension of the assembly of FIG. 19.

FIG. 25 is a top plan view of a spoke, arm or extension of the assembly of FIG. 19.

FIG. 26 is a first side elevation view of a spoke, arm or extension of the assembly of FIG. 19.

FIG. 27 is a second side elevation view of a spoke, arm or extension of the assembly of FIG. 19.

FIG. 28 is a first upper isometric view of a spoke, arm or extension of the assembly of FIG. 19.

FIG. 29 is a further upper isometric view of a spoke, arm or extension of the assembly of FIG. 19.

FIG. 30 is another upper isometric view of a spoke, arm or extension of the assembly of FIG. 19.

FIG. 31 is still another upper isometric view of a spoke, arm or extension of the assembly of FIG. 19.

FIG. 32 is a lower isometric view of a mounting and support hub in the assembly of FIG. 19.

FIG. 33 is a side elevation view of the hub of FIG. 32.

FIG. 34 is a top plan view of the hub of FIG. 32.

FIG. 35 is an upper isometric view of the hub of FIG. 32.

Figures 38, 39:
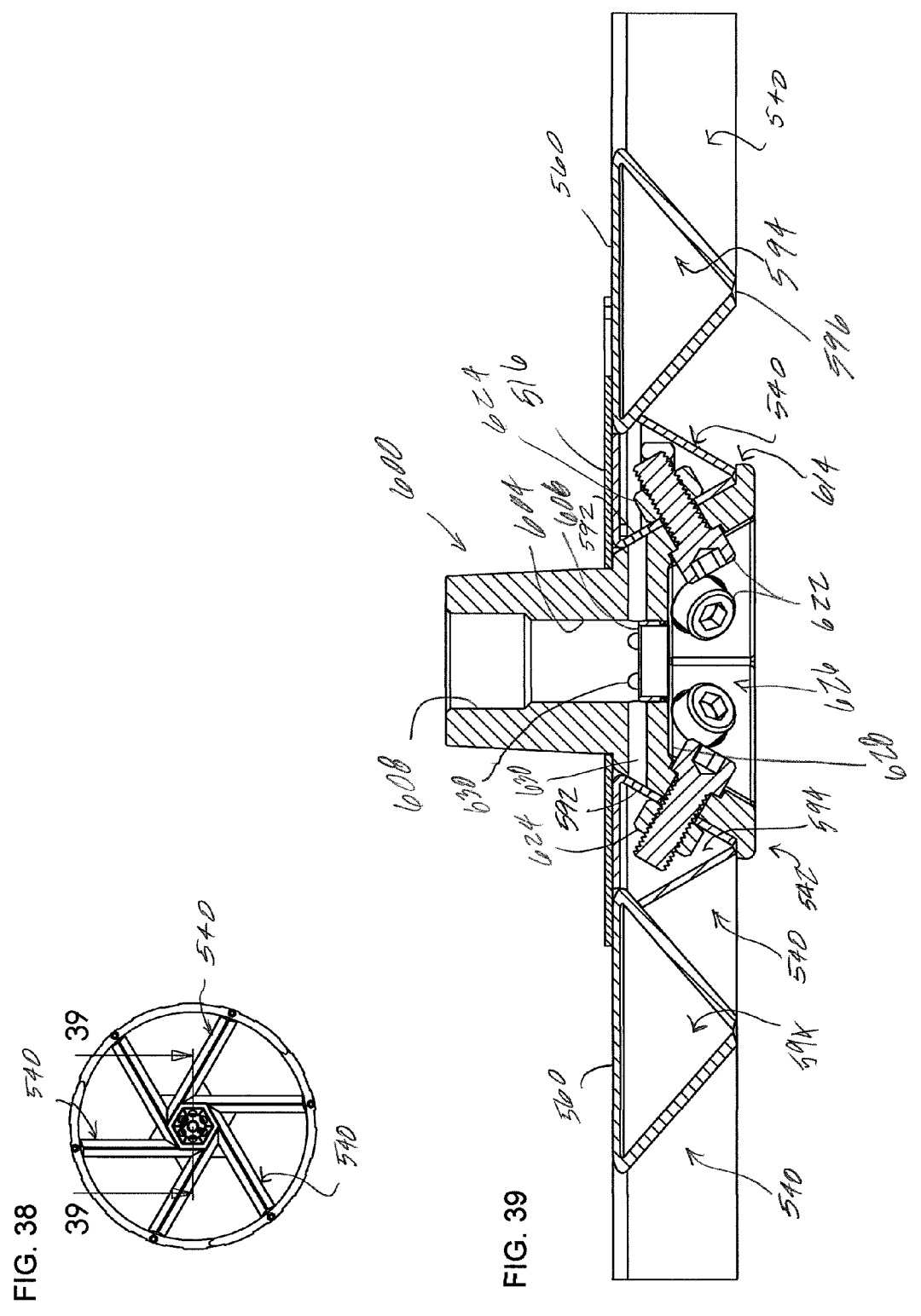

FIG. 38 is a bottom plan view of the assembly of FIG. 19.

FIG. 39 is a partial transverse section of the assembly of FIG. 38 taken along line 39-39.

DETAILED DESCRIPTION

Figure 1:
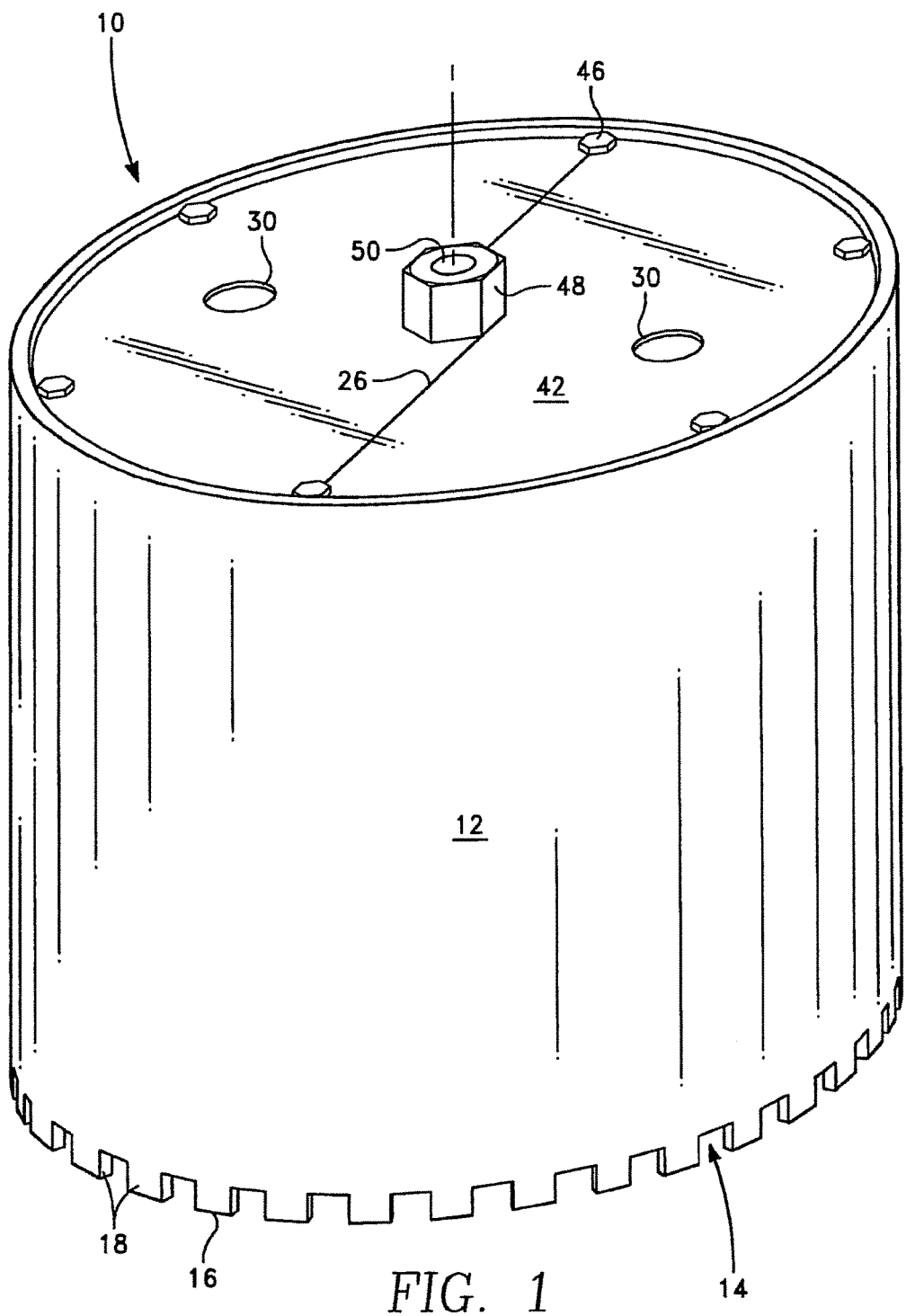
FIG. 1 is an external isometric view of the preferred embodiment of core drill constructed in accordance with this invention.

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Various benefits will become more apparent with consideration of the description of the examples herein. However, it should be understood that not all of the benefits or features discussed with respect to a particular example must be incorporated into a tool, component or method in order to achieve one or more benefits contemplated by these examples. Additionally, it should be understood that features of the examples can be incorporated into a tool, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

It should be understood that terminology used for orientation, such as front, rear, side, left and right, upper and lower, and the like, are used herein merely for ease of understanding and reference, and are not used as exclusive terms for the structures being described and illustrated. In the drawings, reference characters that denote similar elements are used throughout the several views.

Referring in particular to FIG. 1, there is shown the preferred embodiment 10 of the core drill constructed in accordance with this invention. The core drill 10 has a body that is in the shape of a tube 12. This tube 12 will have variable diameter. The tube 12 has a through hollow chamber 14. At one longitudinal end 16 of the core drill 10, there is adhesively or otherwise permanently affixed a series of cutting segments 18. Generally, the cutting segments 18 will comprise diamonds. The cutting segments 18 are what produce the cut within the material, which is generally cement or masonry. This cut is produced by rotation of the tube 12.

Figure 2:
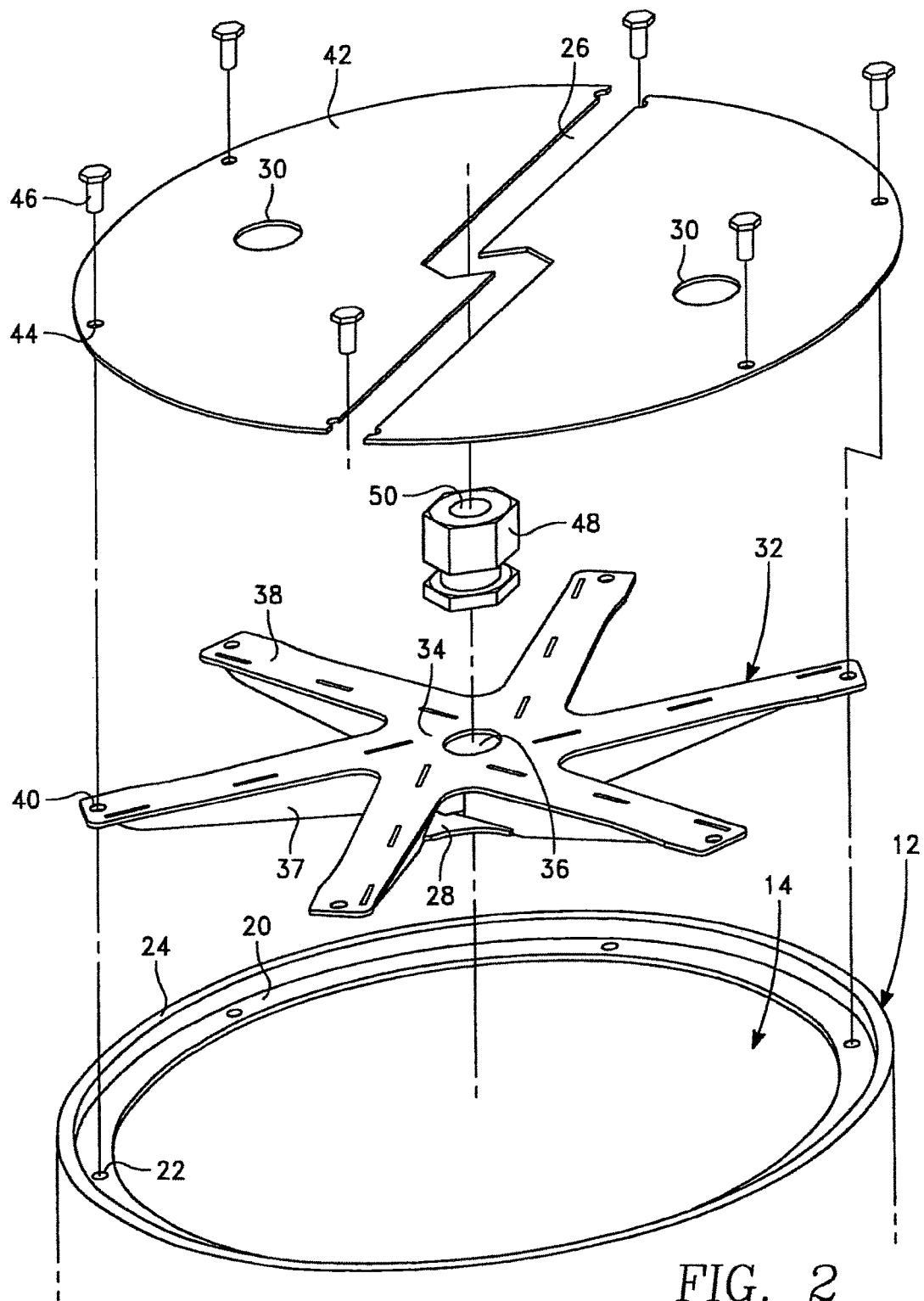
FIG. 2 is an exploded isometric view of the bolt on drive assembly of the preferred embodiment that is constructed in accordance with this invention where the connector of the drive assembly is welded onto a outer disc.

FIG. 2 shows an exploded view of FIG. 1. At the opposite longitudinal end of the tube 12 from one longitudinal end 16 there is located a mounting ring 20. The mounting ring 20 has a series of spaced apart threaded holes 22. The mounting ring 20 is generally no more than one-half to three-quarters of an inch wide and is to be fixedly mounted to the wall of the hollow chamber 14 a slight distance spaced from the outer edge 24 of the tube 12. Normally, this spacing of the mounting ring 20 will be no more than one-half inch. The mounting ring 20 is generally fixedly secured to the tube 12 by welding.

Mounted within the hollow chamber 14 is a disc 42. The disc 42 functions as a cover. The disc 42 has a series of through holes 44 located directly adjacent the peripheral edge of the disc 42. In the preferred embodiment, there are through holes 44 to align with through holes 40 for each of the radial arms 38 of a high strength spoked reinforcer 32. A bolt fastener 46 is to be placed through each of the aligned holes 44, 40 and then be threadably tightened within the threaded hole 22. This will secure in place the drive assembly which is composed minimally of the high strength spoked reinforcer 32 and the disc 42. The disc 26 provides for the prevention of the passage of water through the hollow chamber 14 and prevent such from being discharged from the tube 12 past the mounting ring 20. Water is frequently used when drilling of cement and masonry in order to minimize the creation of heat. Water control can also be achieved by an optional split 26 in the disc 42 as well as one or more apertures 30 found thereon. The drive assembly, which is composed of the high strength spoked reinforcer 32 and the disc 42 is exceedingly strong but is much lighter in weight than if it were a completely solid steel plate. This has an advantage in that the overall core drill is lessened in weight therefore facilitating its carryablity by a human.

Centrally mounted on the disc 42 is a drive connection 48. Drive connection 48 is shown to be in the shape of a hexagonal nut and has an internal threaded opening 48. This internal threaded opening 48 is to connect to a drive shaft of a driving machinery, which is not shown. The driving machinery is to affect rotation of the drive connection 48 and the entire core drill 10. The drive connection is to be welded about center hole 52 formed within the outer disc 42.

Figure 7:
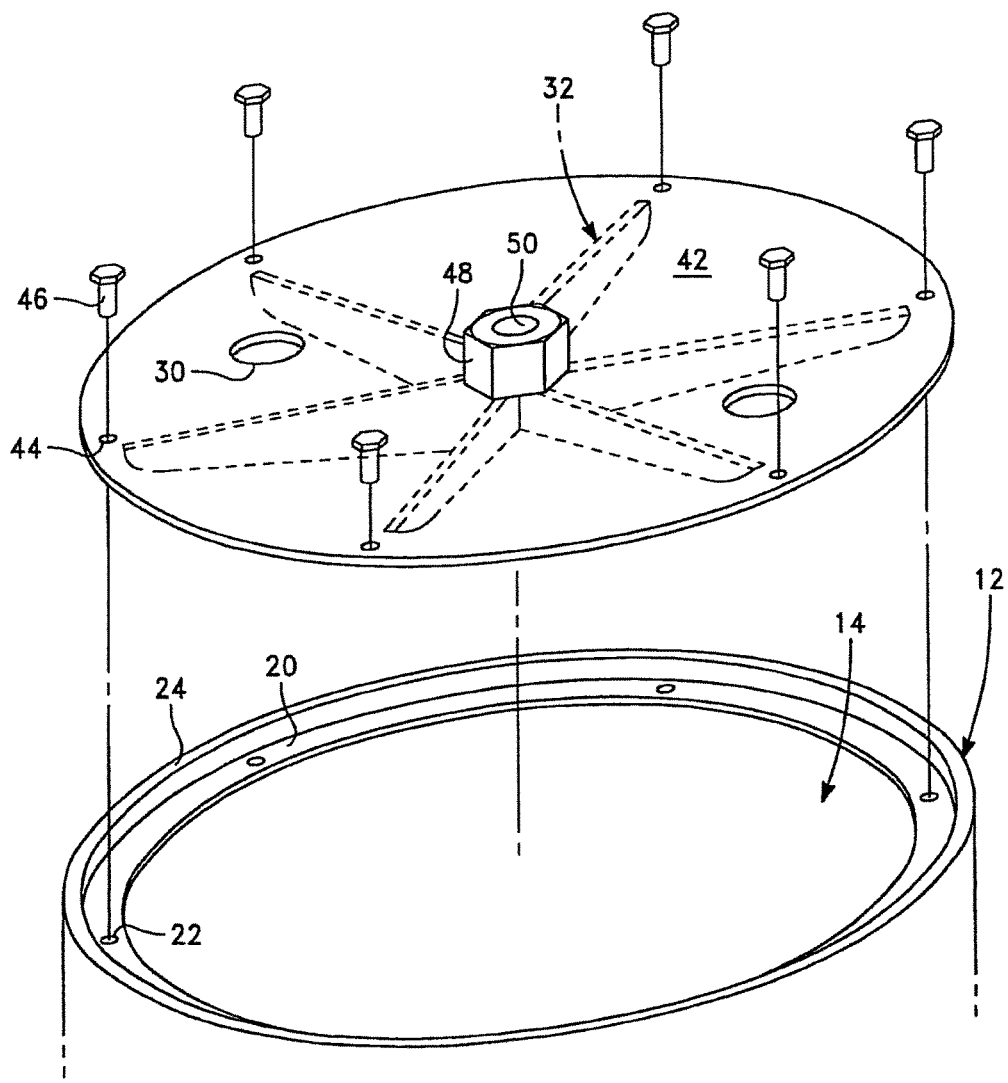
FIG. 7 is similar to FIG. 2, but wherein the high strength spoked reinforcer is welded directly to the top plate.
Figure 8:
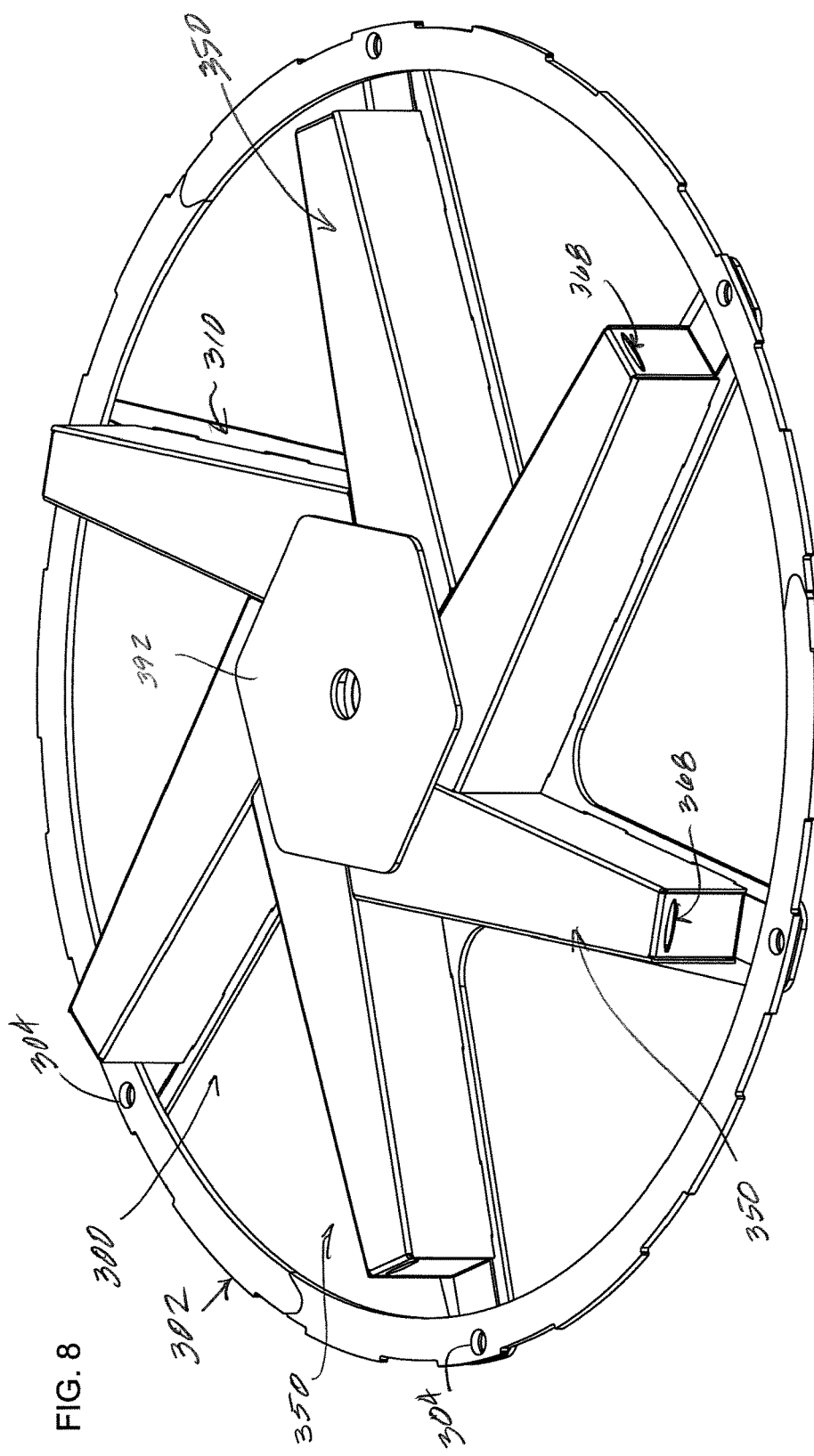
FIG. 8 is an isometric view of an underside of another example of a high strength support for a drill, the support being shown with a mounting ring.

The high strength spoked reinforcer 32 is situated either as a separate part (See FIG. 1) or as an integral welded piece to the disc 42 (See FIG. 7). The high strength spoked reinforcer 32 has a centrally located hub 34 which also has a center hole 36 to facilitate handling. Extending radially outward from the hub 34 are a plurality of spaced apart radial arms 38. There are shown six in numbers of the arms 38. Typically, there will only be used six in number of the arms 38 when the diameter of the tube 12 is thirty inches and less. As the diameter increases, the number of arms 38 may be increased. Directly adjacent the outer end of each of the arms 38 is a through hole 40. A through hole 40 is to be in alignment with a through hole 44. A water stop base 28 sandwiches the high strength spoked reinforce 32 and the disc 42.

As can be seen in FIG. 2, the high strength spoked reinforcer 32 extends along the Z-axis 37 and is 3-dimensional. It is this 3-dimensional structure that provides for the increased performance at high weights with reduced deflection vs. weight ratios. The deflection vs. weight ratio mimics a solid plate's performance whereas a 2-dimensional spoked reinforcer sees significant deflection at higher weights. The high strength spoked reinforcer 38 serves the two fold purpose of reduced weight for larger diameter cores and reduced deflection at said large diameters.

Figure 3:
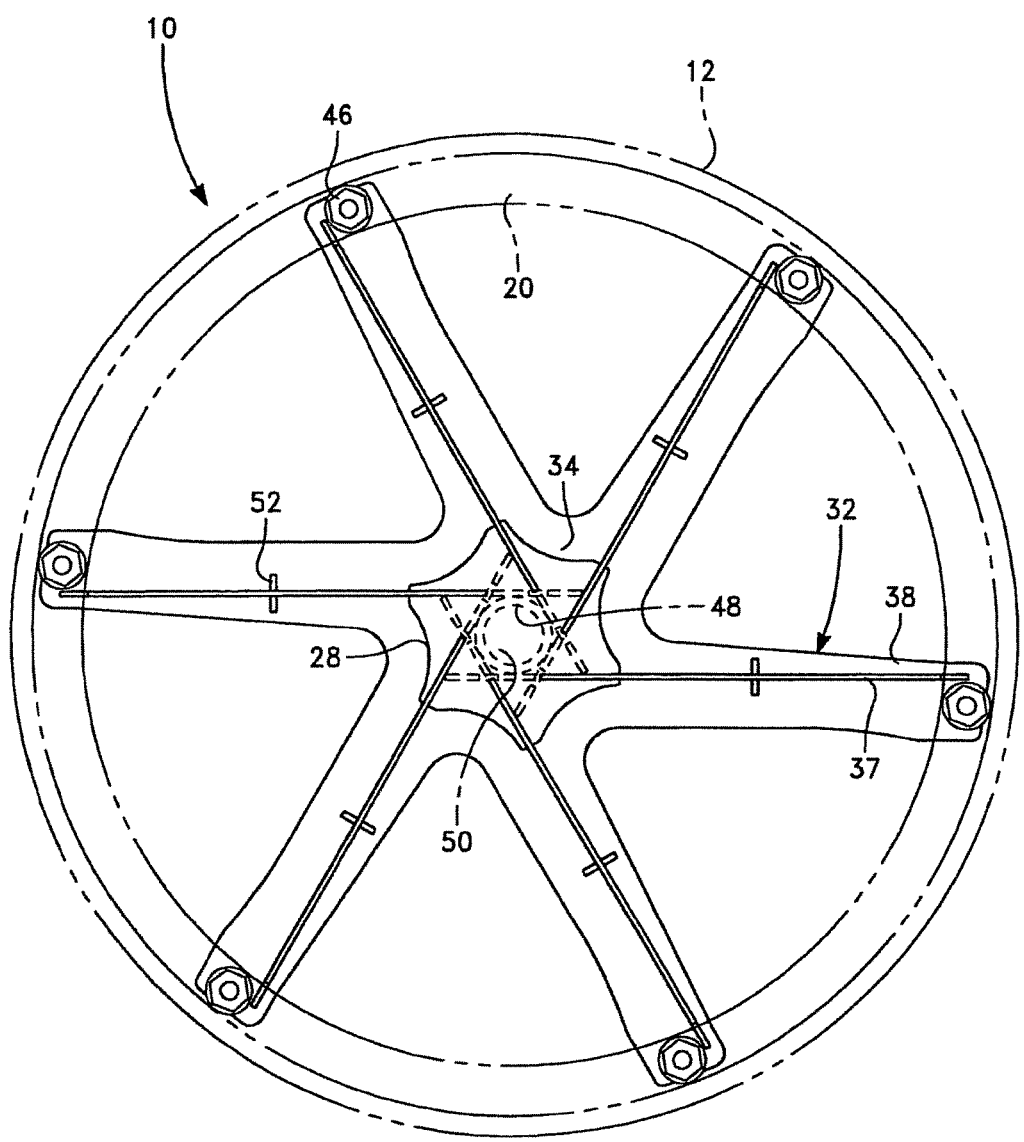
FIG. 3 is an inside bottom view of the high strength reinforcer looking up from the cutting edge of the drill.

FIG. 3 is an inside bottom view of the high strength spoked reinforce 32 when looking up from the water stop base 28. Above the water stop base 26 is the hub 34 of the high strength spoked reinforcer 32. This hub 34 includes the hole 36 that receives the drive connection 48. It is important to note that each of the radial arms 38 are offset from the center 34. This offset distributes the load in an advantageous manner, reducing deflection during use. Also included on the arms 38 are supports 52. When the diameter of the drilling exceeds 32 inches, a support is added for approximately every 9 inches distance from the hub 34.

Note that in the view shown in FIG. 3, the high strength spoked reinforcer 32 can either be bolted to the disc 42 or be formed as an integral piece with the disc 42 and bolted only to the mounting ring 20. FIG. 7 shows the alternate embodiment of the invention wherein the plate 42 is welded to the high strength spoked reinforcer 32. Note that there is no optional split 26 in this embodiment.

Figure 4:
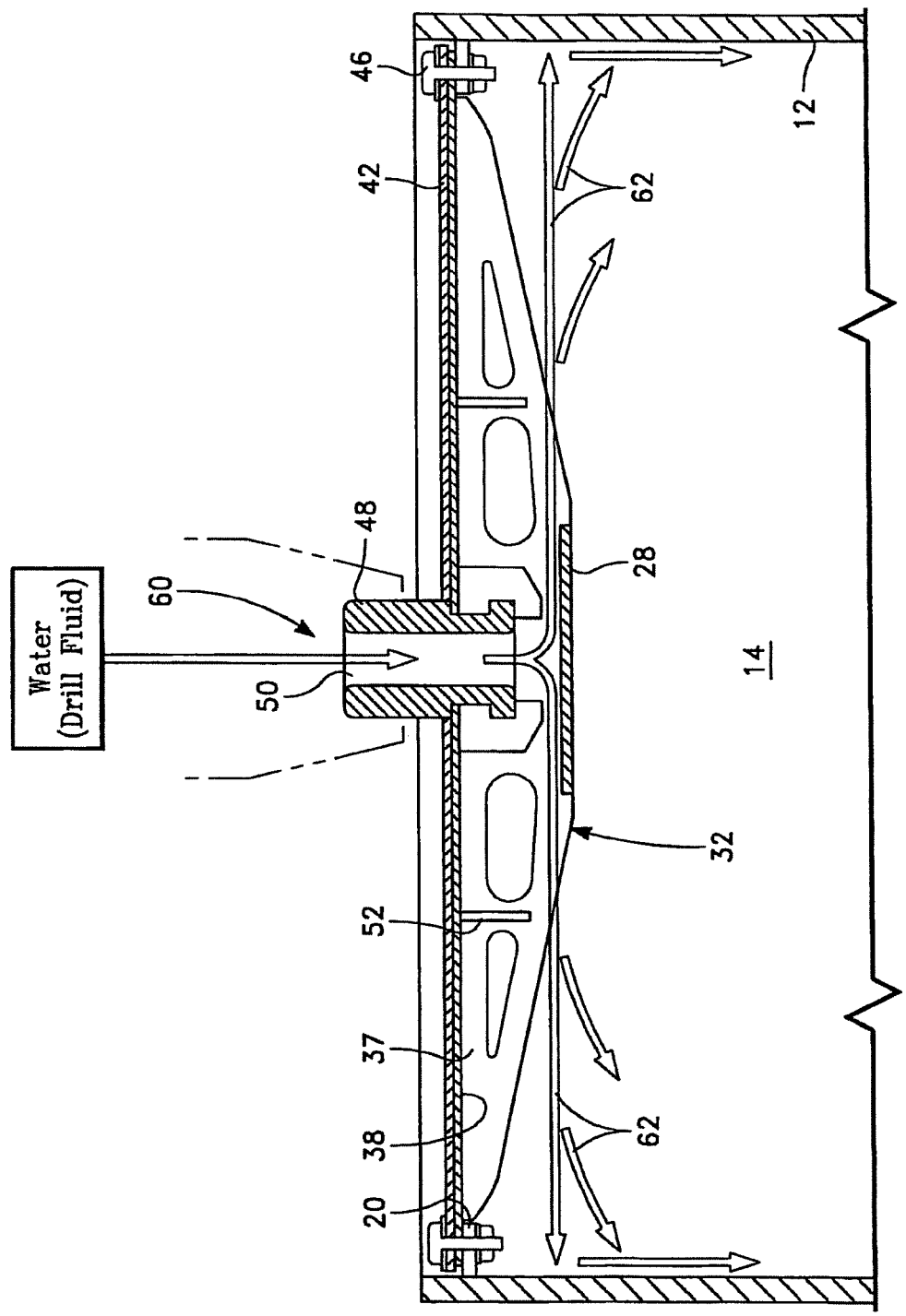
FIG. 4 is a transverse cross-sectional view through the assembled drive assembly of the core drill of the preferred embodiment of this invention.

FIGS. 4-6 show a cross-sectional side view of three different embodiments. In FIG. 4 the preferred embodiment is shown. Drill fluid 60, usually water, enters through the cavity 50 in the drive 48. The direction of the arrows 62 demonstrates how the water enters the system and is flung to the outer edges as the drill is spinning. In this embodiment, the high strength spoked reinforcer 32 is welded to the disc 42 and bolted down through bolts 46 to the mounting ring 20. In this embodiment, the arms 38 have a triangular profile in the direction of the Z-axis 37 relative to the water stop base 28.

FIG. 5 shows an alternate embodiment wherein the high strength spoked reinforcer 32 is bolted to a top disc 42. Also in this embodiment it is shown that the water base plate 28a extends to the outer perimeter of the drill. When the water base plate 28a extends all the way to the outer perimeter, the arms 38 of the high strength spoked reinforcer 32 in the Z-axis 37 are rectangular in profile rather than triangular as seen in FIG. 4. FIG. 6 is the same embodiment as shown in FIG. 5, except that the high strength spoked reinforcer 32 is welded directly to the disc 42 and not bolted on as seen in FIG. 6.

When the instant invention is compared to the system described in U.S. Pat. No. 6,890,132, the improvements in applied load vs. deflection and weight vs. tube diameter are substantial, with the greater benefit being found with increases in the diameter of the core drill 10.

In another example of a reinforcement assembly, reinforcement assembly 300 (FIGS. 8-18) may be mounted or otherwise secured to a mounting ring 302 through holes 304 and fasteners (not shown) so as to enable driving a core drill or other drill. The mounting ring may already be in place on a suitable cylinder, or may be installed on a cylinder as desired. In the present configuration, a single opening and fastener combination is used to secure each arm of the reinforcement assembly to the mounting ring. Other configurations also may be used for combining the reinforcement assembly with a cutting cylinder.

Reinforcement assembly 300 includes a top plate 310 (FIGS. 8-12, and 16-18) helping to support the drill on a drill motor (not shown). In the exemplary configuration, the top plate is a substantially planar member, but can be nonplanar in either the upper surface (the surface visible in FIG. 11), the lower surface (surface visible in FIGS. 8-9, 12) or both. The top plate 310 is preferably formed from a sheet material, for example steel, and includes a central core area 312, which in the present discussion is illustrated as being a circular area 314 of material from which arms, extensions or spokes 316 extend. The central core area can also be considered to transition to the arms 316 at an area defined by a hexagonal shape either interior or external to the imaginary circle 314, for example with the points of the hexagon coinciding with the dashed circle 314, or the dashed circle 314 coinciding with midpoints on a hexagon side between adjacent points. In a further example, the central core area can be considered to transition to the arms 316 where a side surface 318 on an arm (FIG. 11) begins to change direction, for example at line 320.

A hex opening 322 (FIG. 16) or other polygon shape is formed in a center of the top plate for receiving a hex drive nut 324 (FIGS. 10-12 and 18), or drive nut of another geometric configuration suitable for the desired interface between the nut and the top plate.

The top plate (FIG. 11) includes at least one arm 316, and in the present example a plurality of arms 316, formed monolithic with the central core area 312, and extends outwardly to a perimeter area from the central core area. Each arm extends in a respective direction to the perimeter area. In the present example, the perimeter area is the area of the mounting ring 302, and each arm terminates at a respective outer perimeter surface of the mounting ring. The illustrated configuration includes six arms, for example for a drill up to 30 inches in diameter, but may include fewer or more arms, as desired. For example, a drill diameter greater than 30 inches can be supported in part by a reinforcement assembly having eight arms, extensions or spokes. Other elements of the assembly can be modified or adjusted to accommodate the different number of arms.

The present example of the top plate 310 has each of the arms 316 identical to the others. Therefore, the description of one arm 316 also applies to the characteristics of the other arms in the top plate. Each arm 316 extends in a direction off-center of a central axis through the opening 322 of the top plate. Each arm extends from the center core area 312 to a perimeter area 326 (FIG. 11) adjacent the mounting ring 302. In the present configuration, the arm tapers or converges from the center core area to the perimeter end 328 of the arm. A substantial portion, namely the portion between the line 320 and the end 328, of the arm is substantially symmetrical about an arm axis 330. In the present configuration, the arm axis 330 is the principal moment of inertia at the center of mass of the arm between the line 320 and the end 328. The arm axis 330 does not intersect a center axis through the center of the top plate 310, but is tangent to a circle having a non-zero radius centered on the center of the drive nut 324. Therefore, in the present configuration, the arm axis 330 being the principal moment of inertia at the center of mass of the arm as described does not intersect the center, even if a side surface or another surface of an arm might intersect the center.

Figure 16:
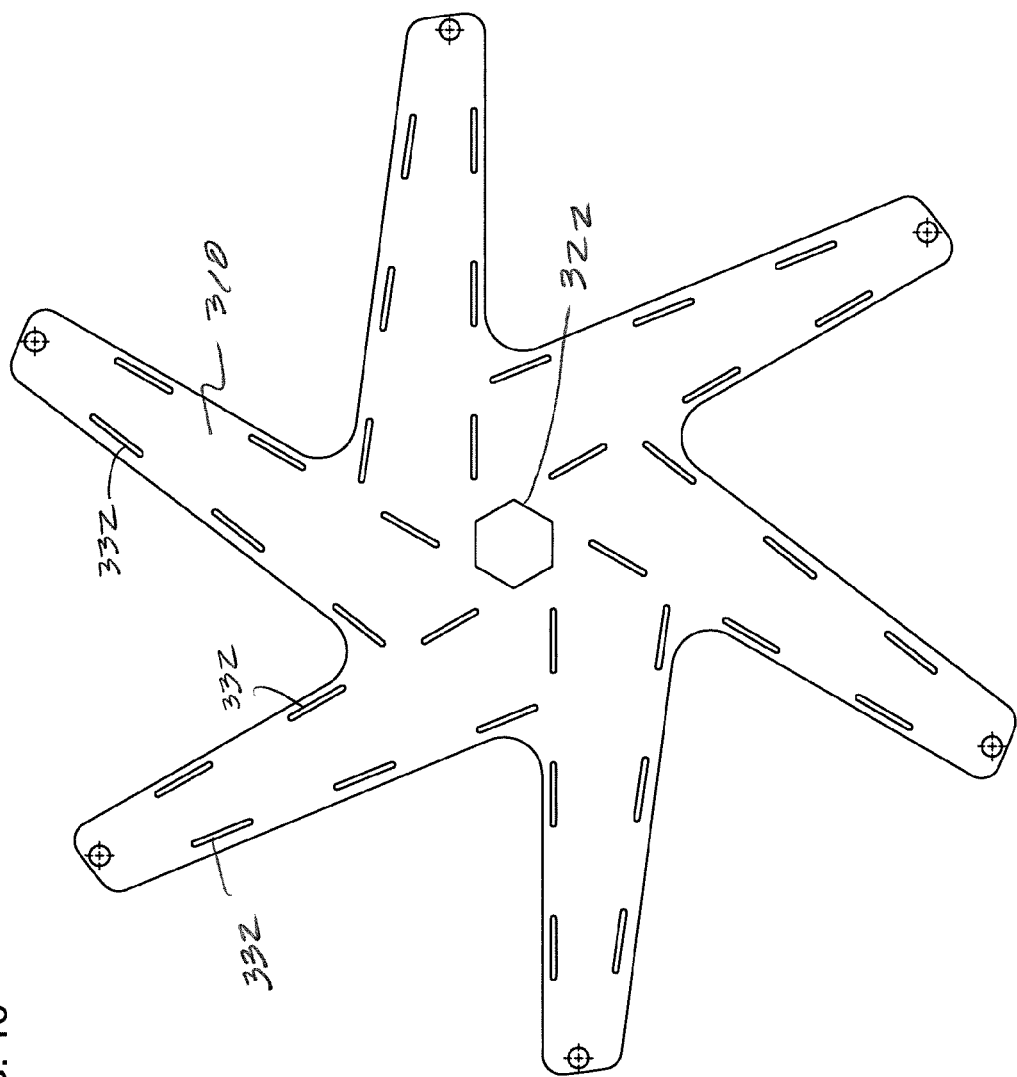
FIG. 16 is a top plan view of the spoke, arm or extension assembly of FIG. 8.
Figure 15:
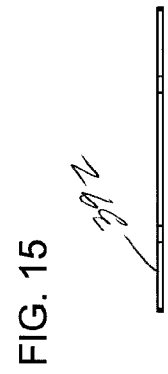
FIG. 15 is a side elevation view of the bottom plate or water plate shown in FIG. 14.
Figure 14:
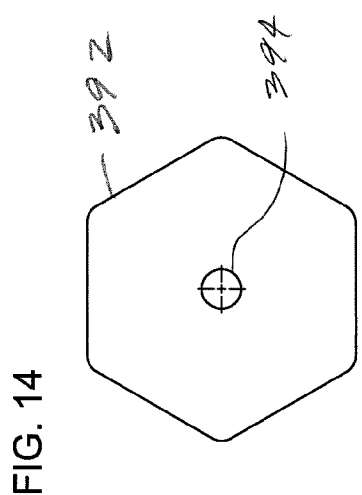
FIG. 14 is a plan view of the bottom plate or water plate of the support of FIG. 8.

The top plate can also include one or more slots or grooves 332 (FIG. 16). The slots can be used to help reinforce or strengthen the reinforcement assembly, for example by receiving and securing on other structures of the assembly, described more fully herein. In the present example, the slots are configured to be aligned with tabs in the other structures, and a plurality of the slots extend along each arm and into the core area. The geometric configuration of the slots can be selected to provide the desired strengthening of the assembly.

The reinforcement assembly 300 also includes a non-planar component 350 (FIGS. 8-10, 12-13 and 18). In the present example, the non-planer component 350 is an angled component having a rectangular cross-section. The angled component is configured to have a geometry complimentary to the geometry of a corresponding arm 316 of the top plate extending outward to the perimeter area. The angled component 350 extends downward from a corresponding arm 316 and away from the arm in the Z-axis direction. In this example, the angled component extends perpendicular to the respective arm to which it is secured, so that a wall of the angled component forms a 90° angle with the arm. While the angled component 350 or any other non-planer component described herein can extend upward, or away from the cutting edge of the drill, from the top plate, it is desirable to keep the height of the angled component in the upward direction below the plane of the mounting ring.

The angled component 350 includes a first wall 352 distal to the center of the top plate, and a second wall 354 proximal to the center of the top plate, and therefore the drive nut 324. In the present example, both the distal and proximal walls extend linearly toward the perimeter portion of the top plate, but nonparallel to each other, while it should be understood that the distal and proximal walls could be configured to be parallel to each other. Though they could be different, the heights of the distal and proximal walls are substantially identical, and they are joined by a transverse wall 356 extending the length of the angled component. In the present example, the transverse wall 356 extends substantially parallel to the arm 316 to which the angled portion is attached. Additionally, the proximal and distal walls and the transverse wall extend linearly parallel to the Z-axis of the drill, and perpendicular to the X-Y direction or plane. Each of these walls are substantially planar. The transverse wall 356 extends substantially parallel to the arm 316 and perpendicular to the Z-axis direction.

In the illustrated configuration, each of the distal and proximal walls include at least one, and as illustrated, a plurality of tabs 358 extending parallel to their respective walls for engaging and being welded to corresponding slots 332 in the top plate. The heights of the respective tabs are typically the same as the depths of the respective slots. Additionally, each angled component 350 includes an end wall 360 extending between the distal and proximal side walls and a transverse wall at a perimeter end portion 362 of the angled component. The end wall 360 can be welded to the adjacent sidewalls, but need not be. The angled component also includes a support tab 364 configured to extend to a respective opening in the mounting ring 302 and between the mounting ring and the corresponding arm 316. The downward-facing surface of the support 364 extends approximately co-planar with the exposed surfaces of the distal and proximal side walls from which the tabs 358 extend.

The angled component 350 can be formed from a sheet of a selected metal, such as steel, and formed into the shape illustrated, having the transverse wall 356 and the sidewalls extending substantially perpendicular thereto, and the end wall 360 also extending perpendicular to the transverse wall 356. In the illustrated angled portion 350, the distal and proximal sidewalls form two Z-axis extending reinforcement portions for each arm 316. Therefore, this non-planer component can be formed from a thinner sheet of material than a single planar portion extending in the Z-axis direction.

The illustrated angled component 350 forms a channel 366 extending in the direction of the respective arm. The channel 366 extends in one configuration at least half way from the drive nut 324 to the outer perimeter portion. The combination of the arm 316 and the channel allows relatively contained fluid flow from a center portion of the reinforcement assembly to a perimeter portion of the assembly. In the illustrated configuration, the end wall 360 includes one or more openings 368 for allowing fluid to flow from the interior of the channel 366 to the outside in the area of the perimeter and the mounting ring 302. The channel has a rectangular or square cross-section at any given position along the axis, for example axis 330, and in the present example is closed off by the end wall 360.

In the present example, the distal wall 354 includes one or more openings for allowing fluid to pass into the channel 366. In the present example, a first opening 370 is formed adjacent the end 372 of the proximal wall 354. A second opening 374 (FIGS. 13 and 18) is formed in the proximal wall adjacent the transverse wall 356. A third opening 376 is formed in a top edge surface of the proximal wall. These openings allow influx of fluid such as water from the drill motor assembly into the channel 366.

Each angled component 350 is secured to its respective arm 316 by inter-engagement of the tabs 358 with respective slots 332, and preferably welded or otherwise secured there. The reinforcement assembly is assembled with the desired number of angled components (six in the present example), and the top plate with the angled components and their respective arms are secured, for example by welding. Adjacent angled components are also secured together in the present example by welding or other means. Each angled component has welds along five junctions with the adjacent surfaces. The proximal wall 354 is welded to the adjacent arm at 378. It is also welded to the distal wall 352 of the adjacent arm at 380. The edge between the proximal wall and the transverse wall is welded to the adjacent transverse wall edge at 382, and the transverse wall is welded to the junction between the proximal wall 354 and transverse wall of the next adjacent angled component at 384. The distal wall 352 is welded to the adjacent arm and 386. The exemplary angled component is also secured to its respective arm by way of the fastener at the mounting ring.

Figures 12, 13:
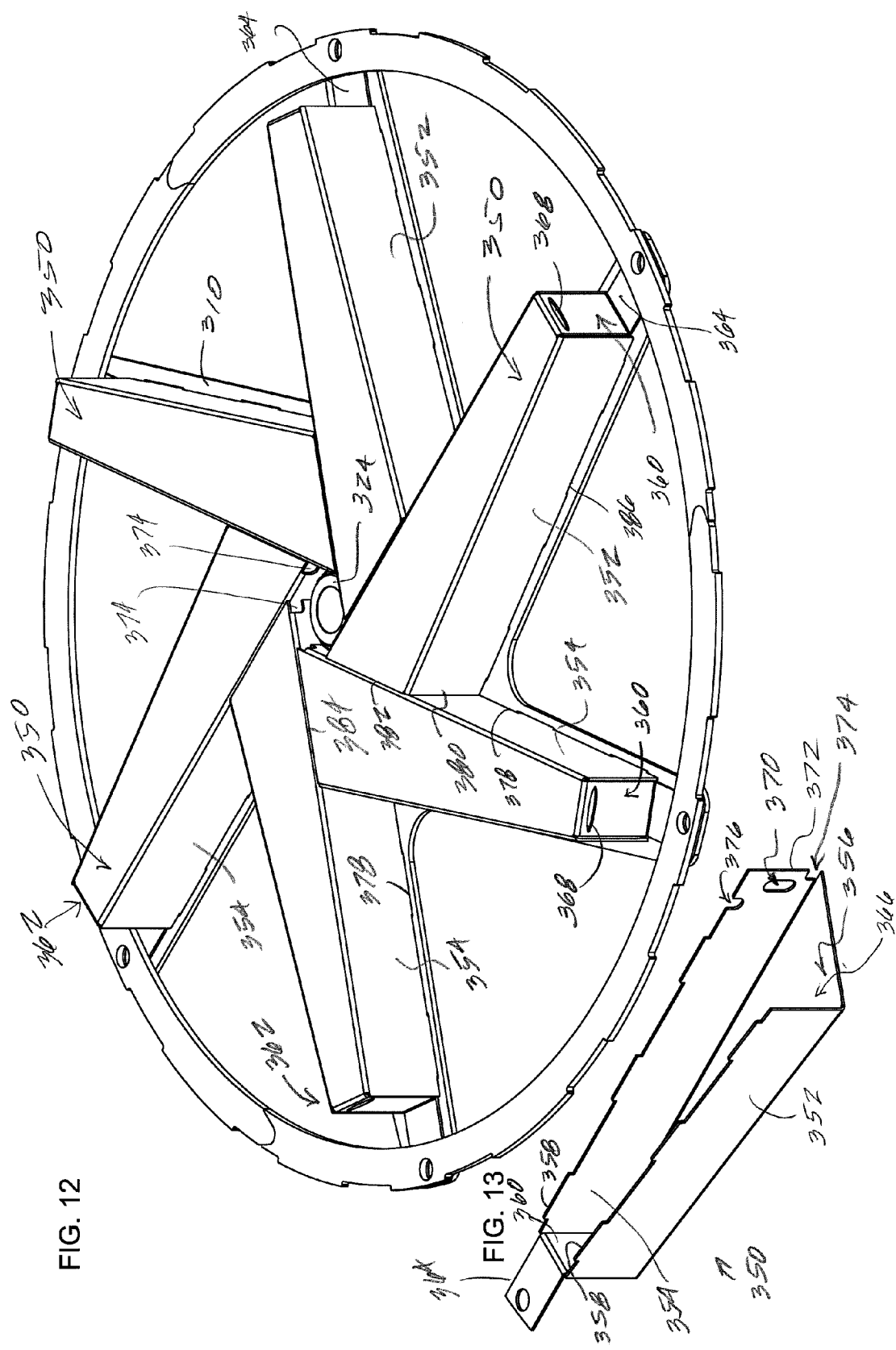
FIG. 12 is an isometric view of the assembly of FIG. 8 with a bottom plate or water plate removed.
FIG. 13 is an upper isometric view of a reinforcement element used with a spoke, arm or extension of the support of FIG. 8.

With the assembly and securement of the angled components 350, intersection of a given proximal wall with an adjacent proximal wall combines with the other intersections to form a hexagonal opening for receiving the drive nut 324 (FIGS. 12 and 18). The hexagonal opening formed by the proximal wall portions is preferably flush with the hexagonal opening 322 in the top plate (FIG. 16). The drive nut 324 can then fit into the opening 322 and into the hexagonal cavity formed by the assembled angled components, and secured thereto, for example by welding or other securement. The hex nut includes outer hexagonal flats and an internal axial bore 388, and outward-extending flow openings 390 extend through the wall of the drive nut at an axial position between the top and bottom of the channels 366 in the adjacent angled components. During use, fluid flows into the bore 388 and out the openings 390 into the hexagonal chamber or manifold defined by adjacent proximal walls. The fluid then flows into respective chambers through one or more of the openings 370, 374 and/or 376.

A bottom plate or water plate 392 (not shown in FIG. 12) is secured to adjacent ones of the angled components 350 and closes part of the hexagonal opening at the bottom of the reinforcement assembly. In the present configuration, the bottom plate has a hexagonal shape, and is welded to adjacent angled portions in the configuration shown in FIG. 8, thereby adding additional strength to the assembly. An opening 394 allows fluid to flow from the bottom of the reinforcement assembly, or it can be closed by a removable plug.

On assembly, the reinforcement assembly can be mounted to the mounting ring 302 and secured to a core drill in a conventional manner. A splash plate can be secured to the top of the assembly in a conventional manner to reduce the amount of water coming out the top of the core drill, for example when drilling horizontally or upwardly. A drill motor can be mounted to the drive nut 324 in the conventional manner and the assembly operated for drilling, with fluid being supplied through the drive nut 324.

In another example of a reinforcement assembly, reinforcement assembly 500 can be secured or otherwise mounted to a mounting ring 302 through holes in the mounting ring using fasteners 302A to allow driving a core drill or other drill (FIGS. 19-41). In the illustrated configuration, a single opening and fastener combination is used to secure each arm of the reinforcement assembly to the mounting ring 302. Other configurations may also be used to configure the reinforcement assembly for a cutting cylinder.

The reinforcement assembly 500 includes a top plate 510 (FIGS. 19-22, 37-39) helping to support the drill on a drill motor (not shown). In the present configuration, the top plate is a substantially planar member, but can be nonplanar in either the upper surface (the surface visible in FIG. 22), the lower surface (the surface visible in FIG. 19), or both. The top plate 510 is preferably formed from a sheet of material, for example steel, and includes a central core area 512 (FIG. 22), which in the present illustration is shown as a circular area 514 of material from which arms, extensions or spokes 516 extend. The central core area can also be considered to include the arms 516 so that the central core area would be defined by an imaginary circle including the outer tips of the arms 516.

A hex opening 522 (FIG. 37) or other polygon shape is formed in a center of the top plate for receiving a hex drive nut or other coupling for a drill motor. Other geometric configurations of the opening and drive nut may be suitable for the desired interface between the nut and the top plate.

The top plate is secured to a plurality of arms, extensions or spokes 540. The arms 540 extend from a central area of the reinforcement assembly to a perimeter area. Each arm extends in a respective direction to the perimeter area. In the present example, the perimeter area is the area of the mounting ring 302, and each arm terminates at a respective outer perimeter surface of the mounting ring. In the configuration illustrated, the reinforcement assembly includes six arms, for example for a drill up to 30 inches in diameter, but may include fewer or additional arms, as desired. For example, a drill diameter greater than 30 inches can be supported in part by a reinforcement assembly having eight arms, extensions or spokes. Other elements of the reinforcement assembly can be modified or adjusted to accommodate the number of arms.

Figure 22:
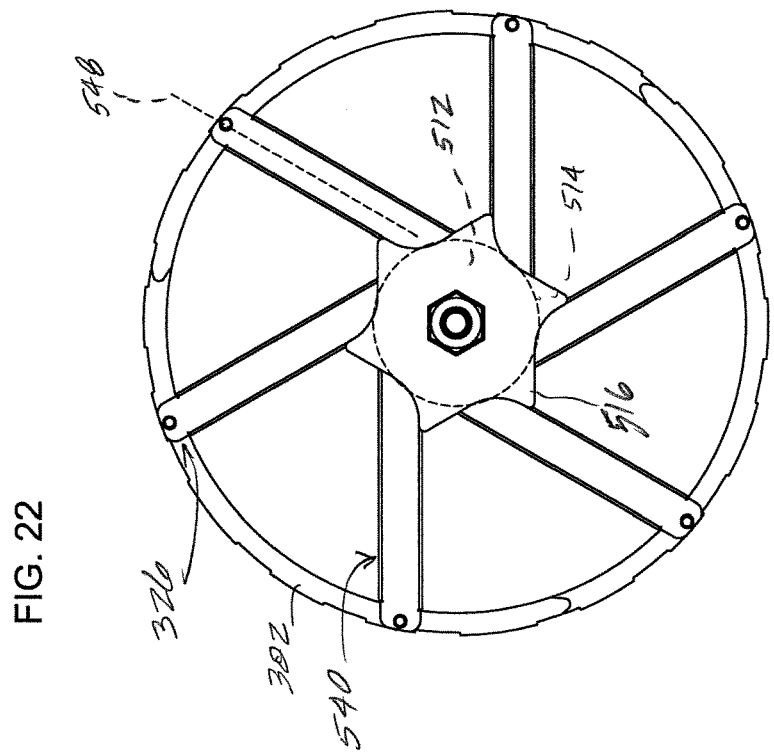
FIG. 22 is a top plan view of the assembly of FIG. 19.
Figure 20:
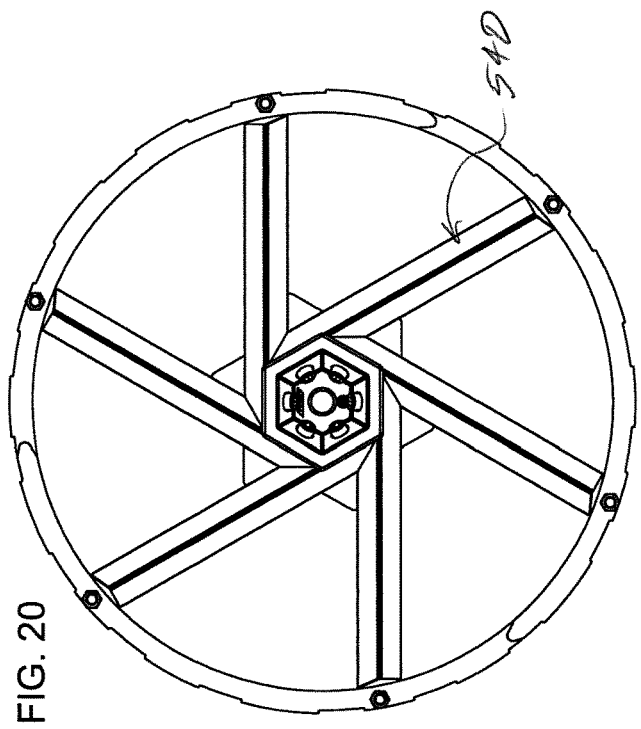
FIG. 20 is a bottom plan view of the assembly of FIG. 19.
Figure 21:
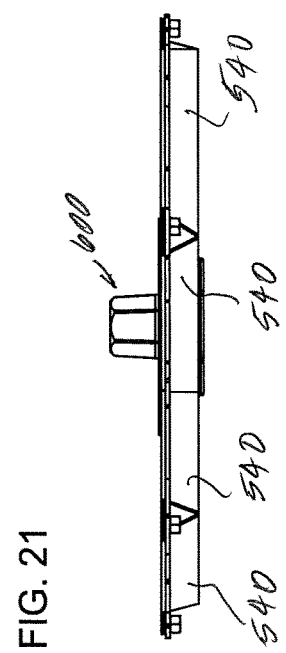
FIG. 21 is a side elevation view of the assembly of FIG. 19.
Figure 36:
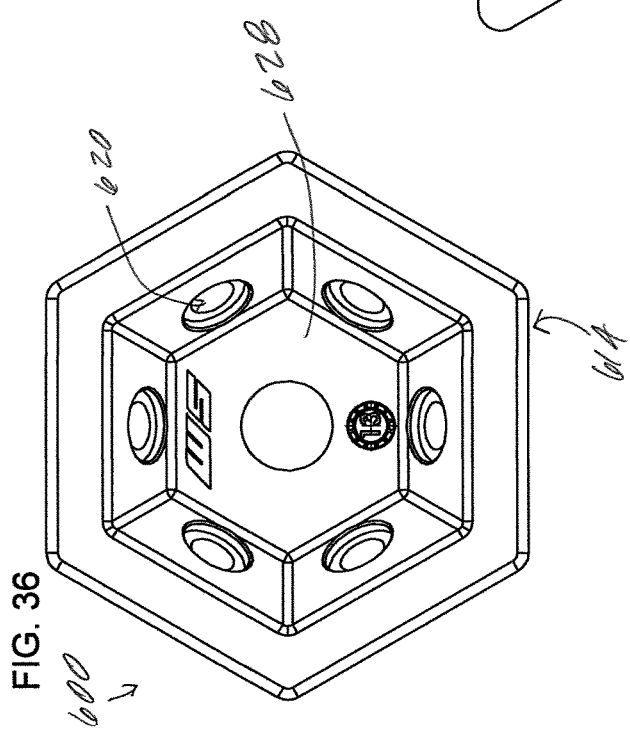
FIG. 36 is a bottom plan view of the hub of FIG. 32.
Figure 37:
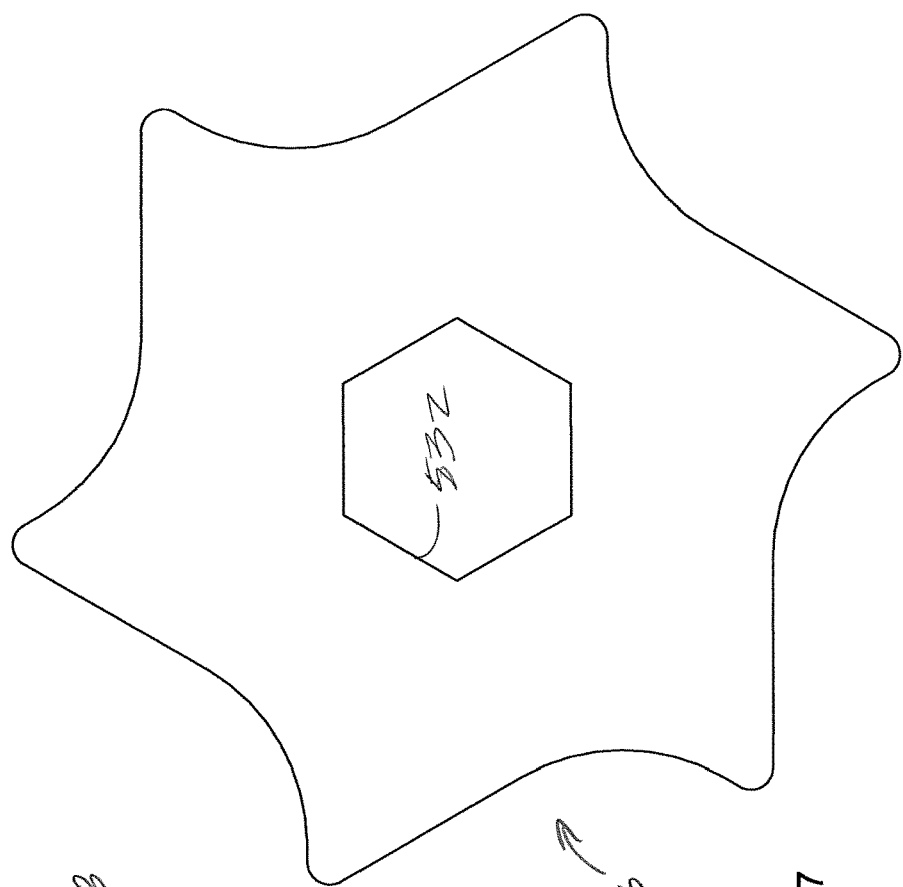
FIG. 37 is a plan view of a top plate in the assembly of FIG. 19.

The present example of the arms 540 has each of the arms 540 identical to the others. Therefore, the description of one arm 540 also applies to the characteristics of the other arms in the reinforcement assembly. Each arm 540 extends in a direction off-center of a central axis through the opening 532 of the top plate. Each arm 540 extends from the central core area 542 to the perimeter area 326 (FIG. 22) adjacent the mounting ring 302. In the present configuration, each arm extends outward to the perimeter area with the arm having a substantially constant width over the length of the arm. A substantial portion, namely the portion between a proximal line 544 and a distal line 546, of the arm is substantially symmetrical about an arm axis 548 (FIGS. 22 and 25). In the present configuration, the arm axis 548 is the principal moment of inertia at the center of mass of the arm between the line 544 and 546, which is in the interior of the arm in the present example with three sides forming an equilateral triangle. The arm axis 548 does not intersect a center axis through the center of the top plate 516, but is tangent to a circle having a non-zero radius centered on the center of the top plate 516. Therefore, in the present configuration, the arm axis 548 being the principal moment of inertia at the center of mass of the arm as described does not intersect the center, even if a side surface or another surface of an arm might intersect the center.

Figure 19:
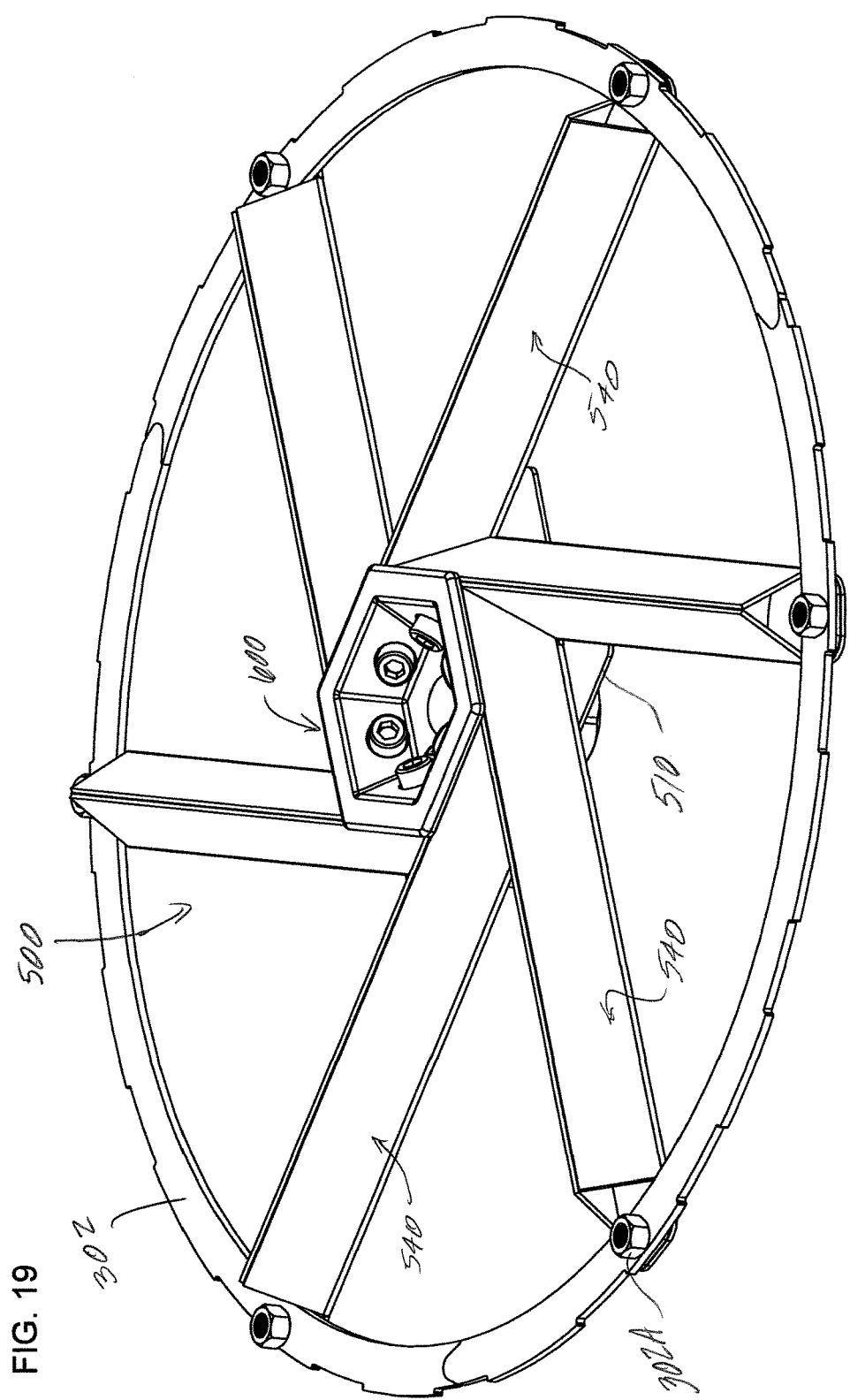
FIG. 19 is an isometric view of an underside of another example of a high strength support for a drill shown with a mounting ring.

The arms 540 are non-planar components and are configured to have a triangular cross-section. The arm is configured to have a geometry that will intersect and reliably support a portion of the mounting ring 302 (FIGS. 19 and 22). The arm is also configured to have a geometry that will reliably intersect and join adjacent arms 540, and to more reliably support a drill cylinder. The arm includes angular portions, described more fully herein, and extends outward from a plane defined by the top plate 516, and away from the top plate in the Z-axis direction. In this example, none of the walls of the arm extends parallel to the Z-axis, but instead extend at an angle to the Z-axis. Additionally, two sides of each arm extend at an angle to the Z-axis, and also at an angle to the X-Y plane. All sides of each arm extends linearly parallel to the arm axis 548. While the arm 540 can extend upward, or away from the cutting edge of the drill, from the top plate, it is desirable to keep the height of the arm 540 in the upward direction below the plane of the mounting ring.

Considering an arm 540 in more detail, each arm of the present example forms a triangle formed from three planar sides extending parallel to the arm axis 548 (FIGS. 19-31 and 38-39). In the illustrated example, the sides form an equilateral triangle. However, it is understood that one or more or all of the arms can be other types of triangles, namely isosceles, right triangle, or other triangular configurations where the sides are unequal. Additionally, the orientation of sides of a triangular arm can be selected as desired where a first surface is adjacent the top plate 516 and other surfaces extend away from the first surface.

In the present exemplary configuration, each arm includes a top side 560, described herein as "top" side for ease of reference not because a positional requirement, extending from a top proximal edge 562 to a top distal end portion 564 having an end surface 566. The top distal end portion includes an opening 568 for securing the distal end of the arm to the mounting ring 302. The proximal end surface 562 is slanted or angled relative to a central axis of the top side 560 (an axis parallel to and overlying the arm axis 548 in the view represented in FIG. 25). The angle is selected so that all of the arms in the reinforcement assembly can butt up against each other, for example in the manner shown in FIGS. 40-41, for six arms having triangular cross-sections and identical geometries. The distal end surface 566 is angled to approximately conform to the curvature of the mounting ring 302 where the arm joins the mounting ring.

Figure 41:
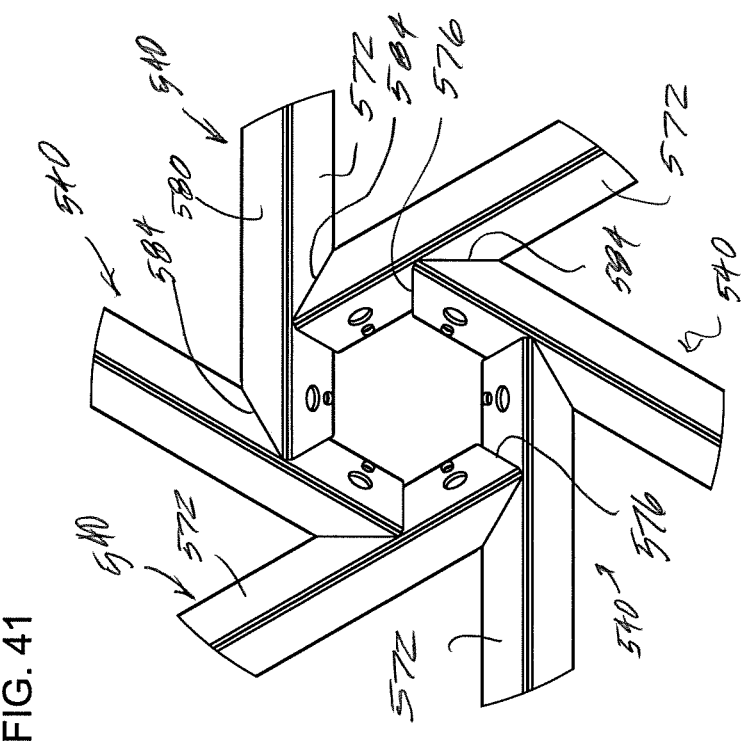
FIG. 41 is a bottom plan and detailed view of the arrangement of FIG. 40.
Figure 40:
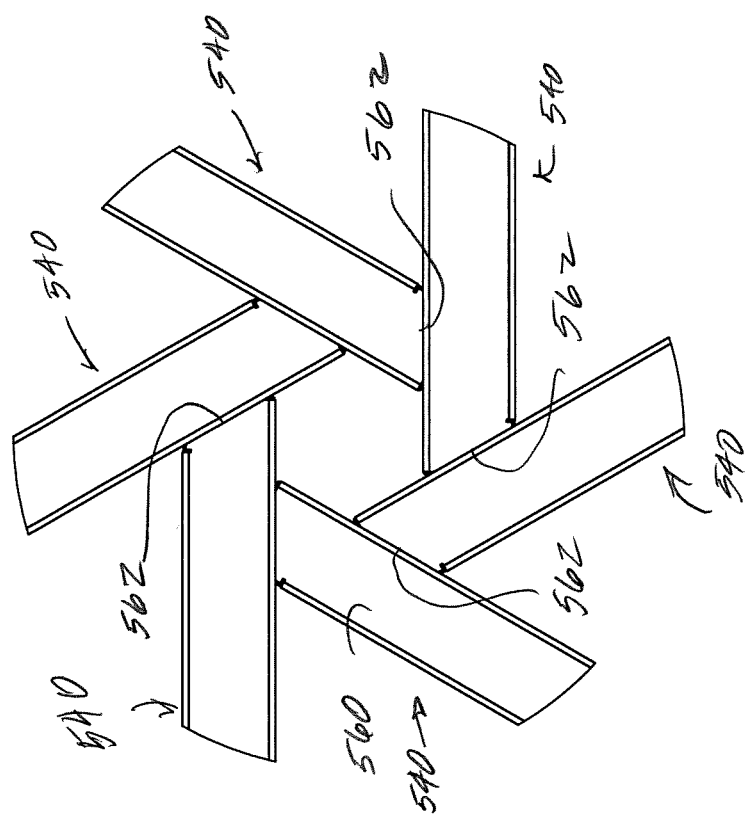
FIG. 40 is a top plan and detailed view of an arrangement of triangular arms for a reinforced assembly configured to receive a hub such as that of FIG. 32.

Each arm 540 includes a proximal end surface 570 that intersects an adjacent arm. The end surface 570 is formed or cut to have a geometry that contacts as closely as possible a side surface of an adjacent arm as illustrated in FIGS. 40-41. The proximal edge 562 extends adjacent a top surface 560 of an adjacent arm 540.

Each arm includes a proximal side surface 572 joining the top surface 560 along a junction 574 (FIG. 25). The proximal side surface 572 is a planar surface and extends in a direction parallel to the arm axis 548 in the present example. The proximal side surface 572 includes a proximal edge surface 576 (FIG. 25) cut or formed so as to extend as closely as possible adjacent a proximal side 572 of an adjacent arm 540 (see FIG. 41). The proximal side surface also includes a distal end surface 578 adjacent the perimeter end portion 564. The distal end surface is configured to allow close-fitting of the distal end portion of the arm with the mounting ring 302.

Each arm 540 includes a distal side surface 580 joining the top surface 560 along a junction 582 (FIGS. 25-27 and 29-31). The distal side surface 580 is a planar surface and extends in a direction parallel to the arm axis 548 in the present example. The distal side surface 580 includes a proximal edge surface 584 cut or formed so as to extend as closely as possible adjacent a distal side surface 580 of an adjacent arm 540 (see FIG. 41). The distal side surface also includes a distal end surface 586 (FIG. 31) adjacent the perimeter end portion 564. The distal end surface is configured to allow close-fitting of the distal end portion of the arm with the mounting ring 302.

In the present example, the top side surface 560, proximal side surface 572 and distal side surface 580 are substantially planar and extend in a direction substantially parallel to the arm axis 548 in the present example. However, it is understood that the proximal and distal side surfaces could converge toward each other in the direction of the perimeter portion 564, and the width of the top side 560 could decrease in the direction of the perimeter. Other configurations are also possible. In the present example, the top side wall 560 is positioned in the reinforcement assembly to extend parallel to the X-Y direction or plane and adjacent and parallel to the top plate 516. At least one of, and in the present example, both of the proximal and distal side walls are configured to extend at an angle to the Z-axis and also at an angle to the X-Y direction or plane. Other orientations are possible for the arms 540, for example by pivoting each arm about the axis 548 a selected amount.

The proximal side surface 572 of each arm includes a fastening hole or securing hole 590 at a proximal end portion of the arm. The fastening hole is approximately centered in the width of the wall. The proximal side surface of each arm also includes an additional hole 592 also at a proximal end portion of the arm. In the present example, the hole 592 is positioned adjacent the top side 560, for example between the fastening hole 590 and the top side 560. The hole 592 allows fluid such as cooling water from the drill motor assembly to pass into the interior of the arm. The interior of the arm 540 forms a channel 594 (FIG. 39) extending along the arm 540. The channel 594 allows fluid to flow from the central portion of the reinforcement assembly to the perimeter portion.

In the present configuration, the arms 540 are formed from planar sheets, for example steel, and cut to the desired geometry for forming. Each of the proximal and distal side surfaces 572 and 580 are then bent or formed downward out of the plane of the top side 560 and inward toward each other to form a seam or joint 596 (FIGS. 27, 29-30 and 39). The seam 596 can then be welded if desired, for example stitch welded or otherwise joined together for greater strength.

The joinder of the arms 540 together, for example as illustrated in FIGS. 40-41, forms a hexagonal opening (octagonal for eight arms, etc.), and an arrangement of arms where any one arm does not intersect a central axis of the assembly. In the present configuration, adjacent arms are welded to each other, and then the top plate 516 is placed on top of the arms and welded thereto around the perimeter of the top plate. In one example, the end of one arm is welded to the adjacent proximal side surface of the adjacent arm, for example around all three sides of the end of the one arm. In another example, the proximal end surface 576 and the proximal end surface 584 are welded to the proximal side 572 of the adjacent arm (see FIG. 41). They can be tack welded in a fixture and then the top plate 516 installed and welded to the arms, and then the proximal end surfaces 576 and the proximal end surfaces 584 can then be completely welded to their respective adjacent arms. Other ways of securing the reinforcement assembly can be used.

The reinforcement assembly 500 is supported on a drill motor and driven by way of a mounting and support hub 600 (FIGS. 32-36 and 39). In the present example, the hub 600 is a monolithic construction, for example a cast or otherwise generated metal structure, but the hex drive portion can be formed separate from the arm support portion and the arm support portion can be made part of the reinforcement assembly. In the present example, the hub 600 includes a hexagonal drive nut 602 and a central bore 604 for receiving water from the drive motor assembly. The end of the central bore is closed with a removable freeze plug 606. Threads are formed in a counterbore 608 for securing the hub to the drive motor assembly.

The drive nut 602 terminates at a hexagonal collar surface 610. The collar surface faces upwardly and extends radially outwardly in a plane substantially transverse to a central axis of the hub 600. On assembly, the top plate 516 rests on or contacts the collar surface 610.

The hub 600 includes an arm support hub 612 from the collar surface 610 to an arm support shoulder 614. The arm support hub 612 is configured to support the proximal portions of the arms 540. The arm support hub includes a plurality of angled or slanted flats 616 diverging downward and outward from the collar surface 610 to the shoulder 614. In the present configuration, the number of flats corresponds to the number of arms in the reinforcement assembly. The flats terminate at an upward-facing shoulder surface 618, which extends radially outward in a plane transverse to a center axis of the hub 600.

The arm support hub 612 includes fastening openings 624 receiving fasteners 622 (FIG. 39) to secure the flats 616 to respective arms to secure the hub in the arm assembly. Fasteners 622 can be bolts threaded into nuts 624 secured in respective channels of the adjacent arms 540. For example, the nuts 624 can be welded to the interior surfaces adjacent the fastening openings 590 or otherwise secured at the openings 590. The holes 620 pass through the sidewalls of the arm support hub 612 from a cavity 626 in the bottom of the support hub through the respective flats 616. The upper portion of the cavity 626 terminates at a transverse wall 628 (FIGS. 32, 36 and 39), where the bore 604 terminates and is closed by the freeze plug 606.

The support hub includes flow channels 630 formed through the walls of the support hub. A flow channel 630 is formed for each arm 540. The flow channels allow fluid from the drill motor assembly in the bore 604 to pass out to the fluid openings 592 in a respective arm. Fluid can flow from the drill motor assembly into the bore 604, out through the channels 630 and the openings 592 into respective arms 540. The fluid can then travel along the channel 594 of the arms out to the perimeter adjacent the core cylinder.

Once the reinforcement assembly 500 is formed, and the arms 540 welded with the top plate 516 in place, the central portion of the assembly will appear as illustrated in FIGS. 40-41. The hexagonal geometry of the proximal portions of the arms is then configured to receive the hub 600 by inserting hub from the lower portion of the reinforcement assembly. It is noted that if the assembly is configured as reversed or flipped and incorporated into the drill system accordingly, the hub would be inserted from what would then be an upper portion of the reinforcement assembly. The proximal side surfaces 572 of each arm rests against the respective flats 616 of the hub, and extend outward toward the perimeter of the assembly. The lower edge of each arm rests on the upward-facing shoulder surface 618 of the hub. Each fluid opening 592 is confluent with a respective flow channel 630. A respective bolt 622 extends through the sidewall of the arm support hub 612, fastener opening 590 and into the adjacent nut 624 for securing the support hub to the arms.

On assembly, the reinforcement assembly 500 can be mounted to the mounting ring 302 and secured to a core drill in a conventional manner. A splash plate can be secured to the top of the assembly to reduce the amount of water coming out the top of the core drill, for example when drilling horizontally or upwardly. A drill motor assembly can be mounted to the hub 600 in a conventional manner, and the assembly operated for drilling, with fluid being supplied through the hub 600 and out the channels in the arms 540.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A drive assembly for a tubular core drill, the drive assembly comprising a tool coupling element having an axis aligned with a center axis for receiving from a first direction a drive tool element for a core drill, a core drill coupling element for supporting a cylindrical core, a plurality of non-planar components secured to and extending distally in respective directions away from the tool coupling element to respective positions on the core drill coupling element and secured to the core drill coupling element, and further including a bottom plate secured to surfaces of the plurality of non-planar components and a top plate having a plurality of spars corresponding to and contacting respective ones of the non-planar components.

2. The assembly of claim 1 further including a cylindrical core cutting drill secured to the core drill coupling element.

3. The assembly of claim 1 wherein the plurality of non-planar components extend in a direction off of a radius relative to the center axis.

4. The assembly of claim 1 wherein at least one of the plurality of non-planar components has a cross-section defining a hollow channel.

5. The assembly of claim 4 wherein the at least one of the plurality of non-planar components has a polygon cross-section.

6. The assembly of claim 4 wherein the at least one of the plurality of non-planar components has one of a rectangular and triangular cross-section.

7. The assembly of claim 1 wherein the at least one of the plurality of non-planar components is at least one of roll formed, extruded and cast.

8. The assembly of claim 1 wherein at least one of the plurality of non-planar components is welded to the tool coupling element or hub.

9. The assembly of claim 1 wherein at least one of the plurality of non-planar components includes an opening at a proximal end of the non-planar component for allowing fluid flow from the tool coupling element into the non-planar component.

10. The assembly of claim 1 wherein the top plate is welded to portions of the plurality of non-planar components.

11. The assembly of claim 1 wherein the plurality of non-planar components includes at least one respective flat surface contacting a flat surface on the top plate.

12. The assembly of claim 1 wherein the plurality of non-planar components each have triangular cross-sections having at least one surface contacting a surface of the top plate and wherein the top plate extends less than an entire distance to the core drill coupling element.

13. The assembly of claim 1 wherein the tool coupling element includes a hub portion extending in the first direction and a plurality of slanted faces adjacent respective ones of the plurality of non-planar components.

14. The assembly of claim 13 wherein the plurality of slanted faces includes respective walls defining openings for receiving fasteners.

15. The assembly of claim 13 wherein the plurality of slanted faces includes respective walls defining openings for allowing fluid to pass through the openings.

16. The assembly of claim 13 further including a shoulder for supporting surfaces of the plurality of non-planar components.

17. The assembly of claim 13 wherein the tool coupling element or hub is a monolithic structure.

18. The assembly of claim 1 wherein proximal end edges of one non-planar component are secured to sides of an adjacent non-planar component.

19. The assembly of claim 1 wherein adjacent non-planar components are welded to each other.

20. The assembly of claim 1 wherein the non-planar components are combined to form a geometric opening.

21. The assembly of claim 1 wherein the non-planar components are combined to form a hexagonal opening.

22. The assembly of claim 1 wherein each of the plurality of spars includes at least one opening into which extends a tab corresponding to respective ones of the non-planar components.

23. The assembly of claim 22 wherein a tab is welded in a respective opening.

* * * * *